United States Patent
Moss

(10) Patent No.: US 12,137,635 B1
(45) Date of Patent: Nov. 12, 2024

(54) LAWNMOWER TOOL RECEIVER APPARATUS AND METHODS

(71) Applicant: Phillip Mark Moss, Springfield, TN (US)

(72) Inventor: Phillip Mark Moss, Springfield, TN (US)

( * ) Notice: Subject to any disclaimer, the term of this patent is extended or adjusted under 35 U.S.C. 154(b) by 0 days.

(21) Appl. No.: 18/657,198

(22) Filed: May 7, 2024

(51) Int. Cl.
*A01D 75/00* (2006.01)
*B60R 11/06* (2006.01)
*A01D 101/00* (2006.01)
*B60R 11/00* (2006.01)

(52) U.S. Cl.
CPC ........ *A01D 75/008* (2013.01); *A01D 2101/00* (2013.01); *B60R 2011/0057* (2013.01); *B60R 11/06* (2013.01)

(58) Field of Classification Search
CPC .................. A41D 75/002; B60R 11/06; B60R 2011/0057
USPC ........ 224/562, 410, 922, 571; 248/312, 314; D22/147; D6/552
See application file for complete search history.

(56) References Cited

U.S. PATENT DOCUMENTS

| | | | | |
|---|---|---|---|---|
| 2,491,008 A | * | 12/1949 | Lake | A01K 97/10 224/103 |
| 3,215,463 A | * | 11/1965 | Addy | E01H 1/12 294/1.4 |
| 4,901,970 A | * | 2/1990 | Moss | A01K 97/10 403/385 |
| 4,932,152 A | * | 6/1990 | Barlotta | A01K 97/10 248/515 |
| 5,205,446 A | * | 4/1993 | Greenberg | B60R 9/08 224/511 |
| D337,807 S | * | 7/1993 | Hoover | D22/147 |
| 5,321,904 A | * | 6/1994 | Benson | A01K 97/10 248/223.41 |
| 5,360,190 A | * | 11/1994 | Walker | B60R 7/14 224/570 |
| 5,411,191 A | * | 5/1995 | Bunn, Jr. | A47F 7/0021 248/314 |
| D377,387 S | * | 1/1997 | Mathewson | D22/147 |
| D393,690 S | * | 4/1998 | Lovelady | D22/147 |
| D409,274 S | * | 5/1999 | Morse, Jr. | D22/147 |
| 5,957,352 A | * | 9/1999 | Gares | B62B 1/26 24/339 |
| 6,041,717 A | * | 3/2000 | Kubat | B60R 11/06 224/547 |
| 6,042,080 A | * | 3/2000 | Shepherd | B60R 11/00 248/688 |
| D458,878 S | * | 6/2002 | Greco | D12/162 |
| D490,768 S | * | 6/2004 | Baynes | D12/407 |

(Continued)

*Primary Examiner* — Justin M Larson
(74) *Attorney, Agent, or Firm* — Holland & Knight LLP; Matthew C. Cox; Forrest S. Tinnin

(57) ABSTRACT

The present disclosure provides for a tool receiver apparatus for a lawnmower. The apparatus may include a base, a post, an arm, and a sleeve. The base may include a magnet configured for magnetic engagement with a surface of the lawnmower. The post may be disposed on the base and extend upwardly from the base. The arm may extend laterally from the post. The sleeve may be disposed on the arm. The sleeve may include an upper end forming an upper opening, a lower end forming a lower opening, and a passage extending between the upper opening and the lower opening. The sleeve may be configured to receive a tool with a jaw assembly.

20 Claims, 31 Drawing Sheets

(56) References Cited

U.S. PATENT DOCUMENTS

| | | | |
|---|---|---|---|
| 6,808,098 B1 * | 10/2004 | Bickett, III | B60D 1/36 |
| | | | 116/28 R |
| D515,897 S * | 2/2006 | Greene | D8/71 |
| 7,261,349 B1 * | 8/2007 | Gregor | B25B 9/00 |
| | | | 294/100 |
| 7,275,729 B2 * | 10/2007 | Sherman | A47L 13/51 |
| | | | 248/311.2 |
| 7,789,369 B2 * | 9/2010 | Jahnz | B60R 13/005 |
| | | | 224/571 |
| 7,980,609 B2 * | 7/2011 | Khubani | B25J 1/04 |
| | | | 294/111 |
| 8,123,190 B2 * | 2/2012 | Kost | G09F 21/04 |
| | | | 248/514 |
| 8,695,935 B1 * | 4/2014 | Kasbohm | F41A 23/18 |
| | | | 42/99 |
| 10,210,780 B2 * | 2/2019 | Williams, Jr. | G09F 17/00 |
| 10,322,683 B2 * | 6/2019 | Lawrence | A01D 75/008 |
| 10,500,715 B1 * | 12/2019 | Fleming | B25J 18/04 |
| 10,798,930 B1 * | 10/2020 | Rodriguez | B60R 9/08 |
| 11,198,401 B2 * | 12/2021 | Tressel | A01D 75/006 |
| D1,005,815 S * | 11/2023 | Eshelman | D15/28 |
| 11,813,735 B2 * | 11/2023 | Khubani | B25J 1/02 |
| 11,904,780 B2 * | 2/2024 | Kroll | B25H 3/00 |
| 2003/0122357 A1 * | 7/2003 | Rhue | B60R 11/06 |
| | | | 280/770 |
| 2005/0167457 A1 * | 8/2005 | Barnett | B60N 3/103 |
| | | | 224/183 |
| 2010/0127028 A1 * | 5/2010 | Lusk | B62B 1/20 |
| | | | 224/538 |
| 2012/0000955 A1 * | 1/2012 | King | B60R 9/02 |
| | | | 224/545 |
| 2015/0213741 A1 * | 7/2015 | Bigham | F16M 13/02 |
| | | | 116/173 |
| 2015/0284017 A1 * | 10/2015 | Nilsen | B62B 1/262 |
| | | | 224/401 |

* cited by examiner

LAWNMOWER TOOL RECEIVER APPARATUS AND METHODS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not applicable.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates generally to lawnmowers. More particularly, the present disclosure relates to apparatuses for securing handheld tools aboard lawnmowers.

Commonly, an operator of a lawnmower will use a handheld tool for retrieving obstructions (e.g., trash, debris, rocks, etc.) in the lawnmower's path or on either side of the lawnmower. Such obstructions may either be harmful to the blades underneath the lawnmower, or may otherwise be undesirable for collecting amongst the typical grass clippings collected by the lawnmower during use. Such handheld tools for retrieving the obstructions may be a "grabber arm," "a pickup handheld tool," or some other similar device.

In some cases, such handheld tools are placed a distance outside the path of the lawnmower, in which case the operator must stop the lawnmower, retrieve the handheld tool, and place the handheld tool back in its resting location prior to continuing use of the lawnmower, which presents issues of inefficiency in the lawnmowing processes. In other cases, such handheld tools are placed somewhere about the lawnmower itself (e.g., at the operator's feet, in a cupholder, etc.), which presents issues of the handheld tool falling from the lawnmower, and resulting inefficient scenarios where the operator must stop the lawnmower and retrieve the handheld tool, or even dangerous scenarios of the handheld tool falling into the path of the lawnmower or the operator inadvertently reacting by reaching down for the handheld tool and compromising their control of the lawnmower.

In other cases still, conventional systems for retaining such handheld tools generally involve a bracket fixed to the body of the lawnmower. Such conventional systems present even more issues. First, such conventional brackets must often be screwed or otherwise mechanically fixed to the body of the lawnmower, requiring specialized adaptation of the lawnmower body (e.g., creating holes). Second, such conventional brackets typically hold or pinch the handheld tool in a manner that leaves the handheld tool vulnerable to inadvertent bumps or other contacts which may easily release the handheld tool from the bracket. Third, such handheld tools often retain some degree of debris after use (e.g., grass clippings, pieces of trash, moisture, etc.), and such conventional systems typically allow for such debris to ultimately fall to the floor or other various surfaces of the lawnmower.

It would be advantageous to provide an apparatus for retaining handheld tools aboard lawnmowers that resolves the aforementioned issues, as well as other various issues present in the field of conventional systems. What is needed, then, are improvements in apparatuses and methods for handheld tool retainers aboard lawnmowers.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure provides for a lawnmower tool receiver apparatus. The apparatus may include a base having a magnet configured for magnetic engagement with a surface of the lawnmower. The apparatus may further include a sleeve secured to the base. The sleeve may include an upper end forming an upper opening, a lower end forming a lower opening, and a passage extending between the upper opening and the lower opening. The passage may form a first width. The sleeve may be configured to receive a tool with a jaw assembly. The jaw assembly may form a second width (or open jaw width) when the jaw assembly is open, and a third width (or closed jaw width) when the jaw assembly is closed or partially closed. The first width may be less than the second width, and equal to or greater than the third width. For example, the when the tool is received by the sleeve, the sleeve may frictionally engage the jaw assembly of the tool.

In some embodiments, the apparatus further includes an arm. The sleeve may be secured to the base by the arm. For example, the arm may include a first end secured to the base and a second end opposite the first end, the second end disposed on the sleeve. In some embodiments, the apparatus further includes a post. The arm may be secured to the base by the post. For example, the post may be disposed on the base and extend upwardly from the base, and the first end of the arm may be disposed on the post.

In some embodiments, the lower opening of the sleeve includes a grate, and the sleeve may be secured to the base such that a gap is formed between the lower opening of the sleeve and the surface of the lawnmower.

In some embodiments, the base forms a circular profile, and the passage forms a square profile. In other embodiments, the passage forms a circular profile.

Numerous other objects, advantages and features of the present disclosure will be readily apparent to those of skill in the art upon a review of the following drawings and description of a preferred embodiment.

DETAILED DESCRIPTION

Figure 1:
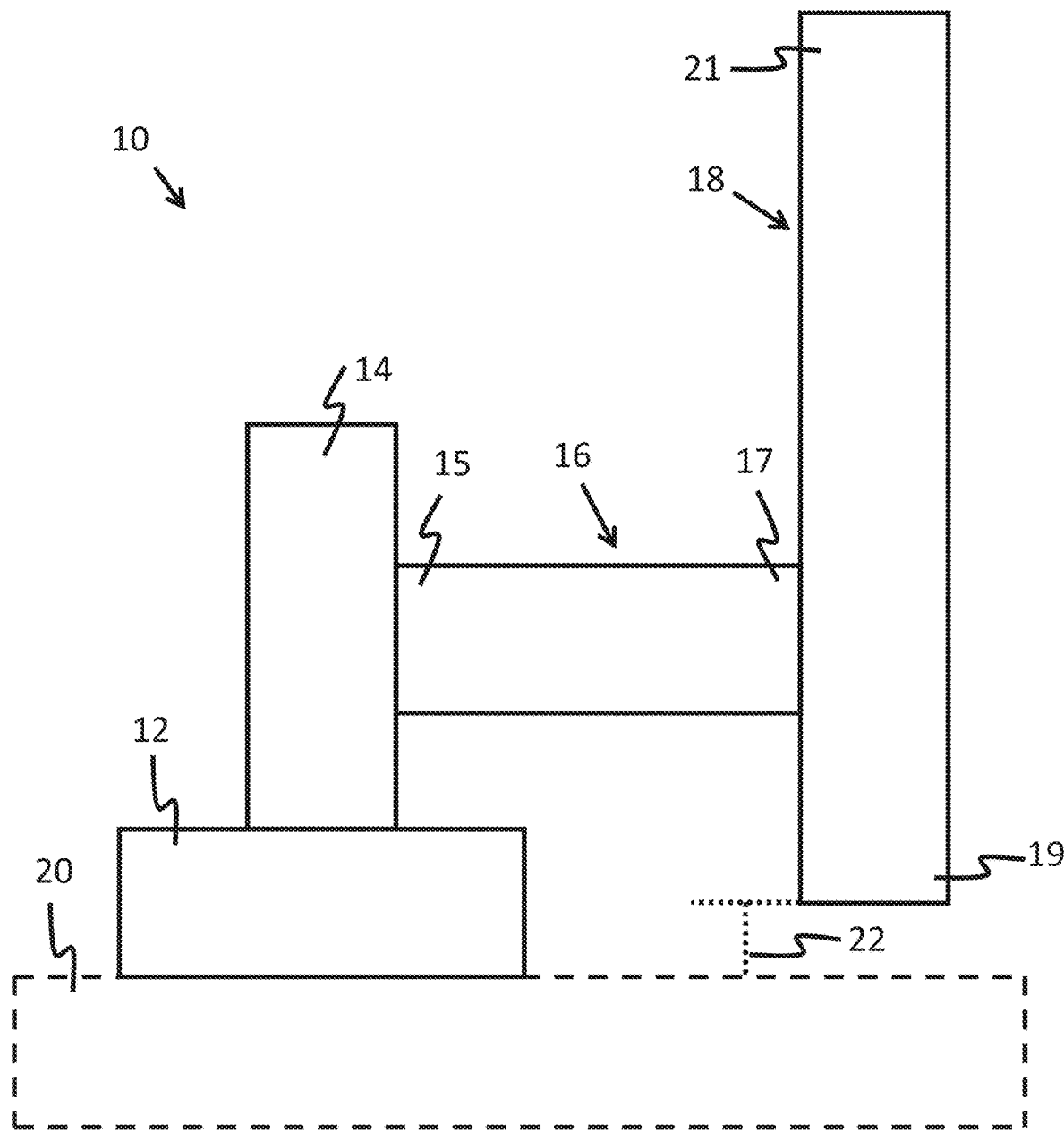
FIG. 1 is a schematic illustration of a lawnmower tool receiver apparatus, including a base, a post, an arm, and a sleeve, according to some embodiments of the present disclosure.
Figure 2:
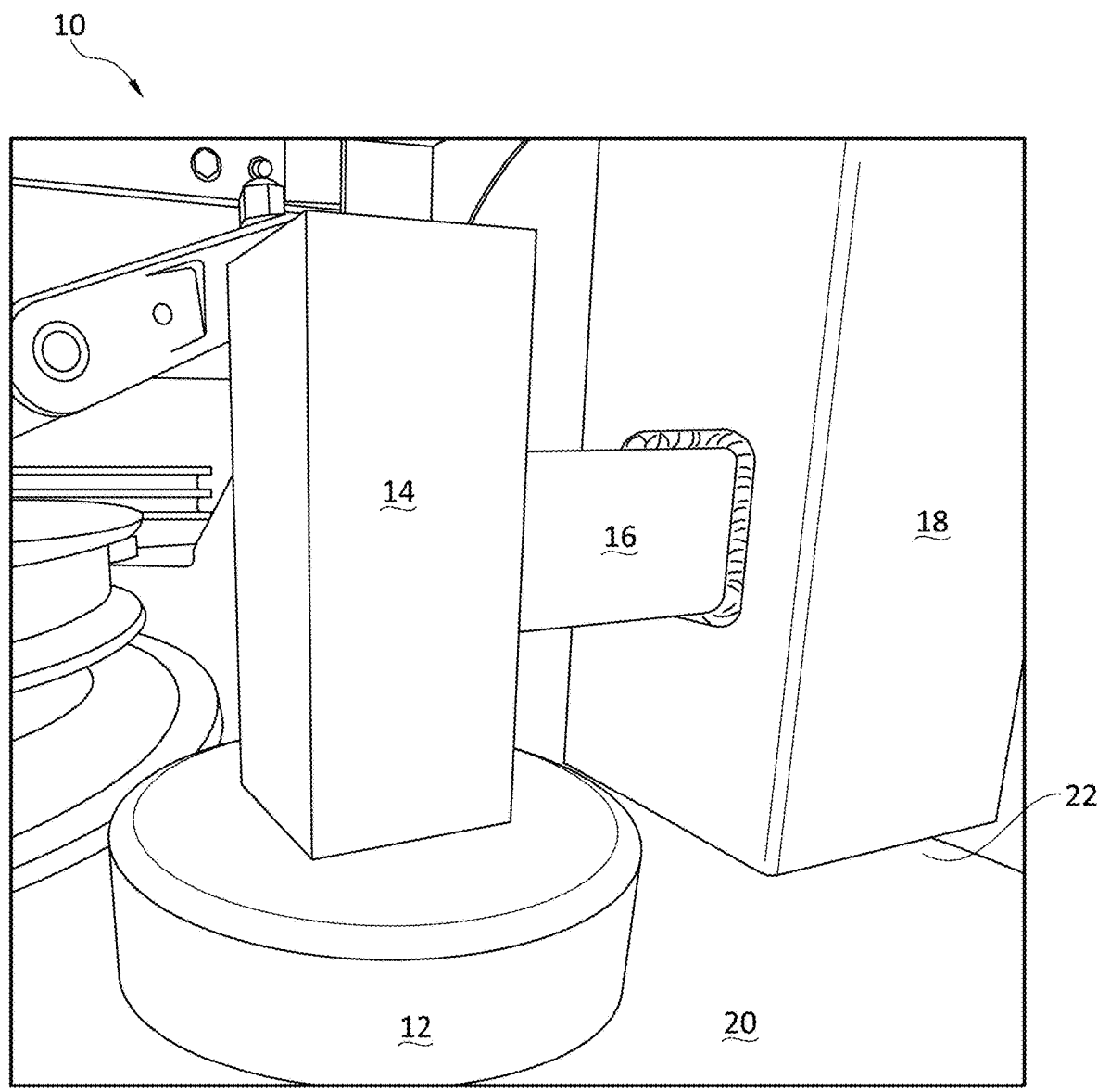
FIG. 2 is an exemplary implementation of the apparatus of FIG. 1, according to some embodiments of the present disclosure.
Figure 3:
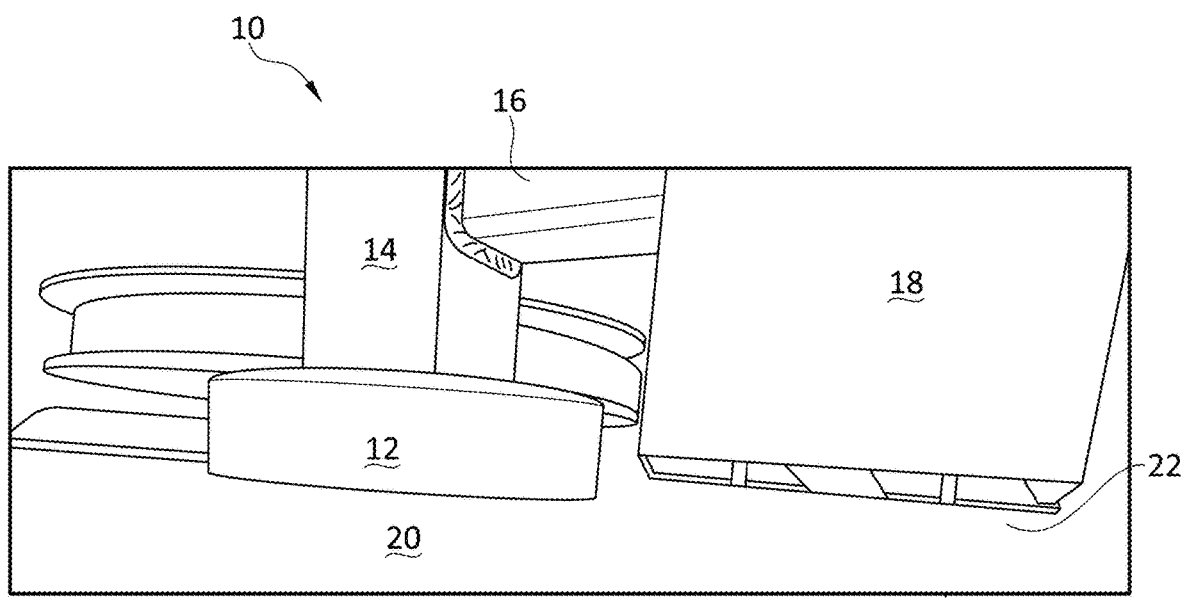
FIG. 3 is a detailed lower view of an exemplary implementation of the apparatus of FIG. 1, according to some embodiments of the present disclosure.
Figure 4:
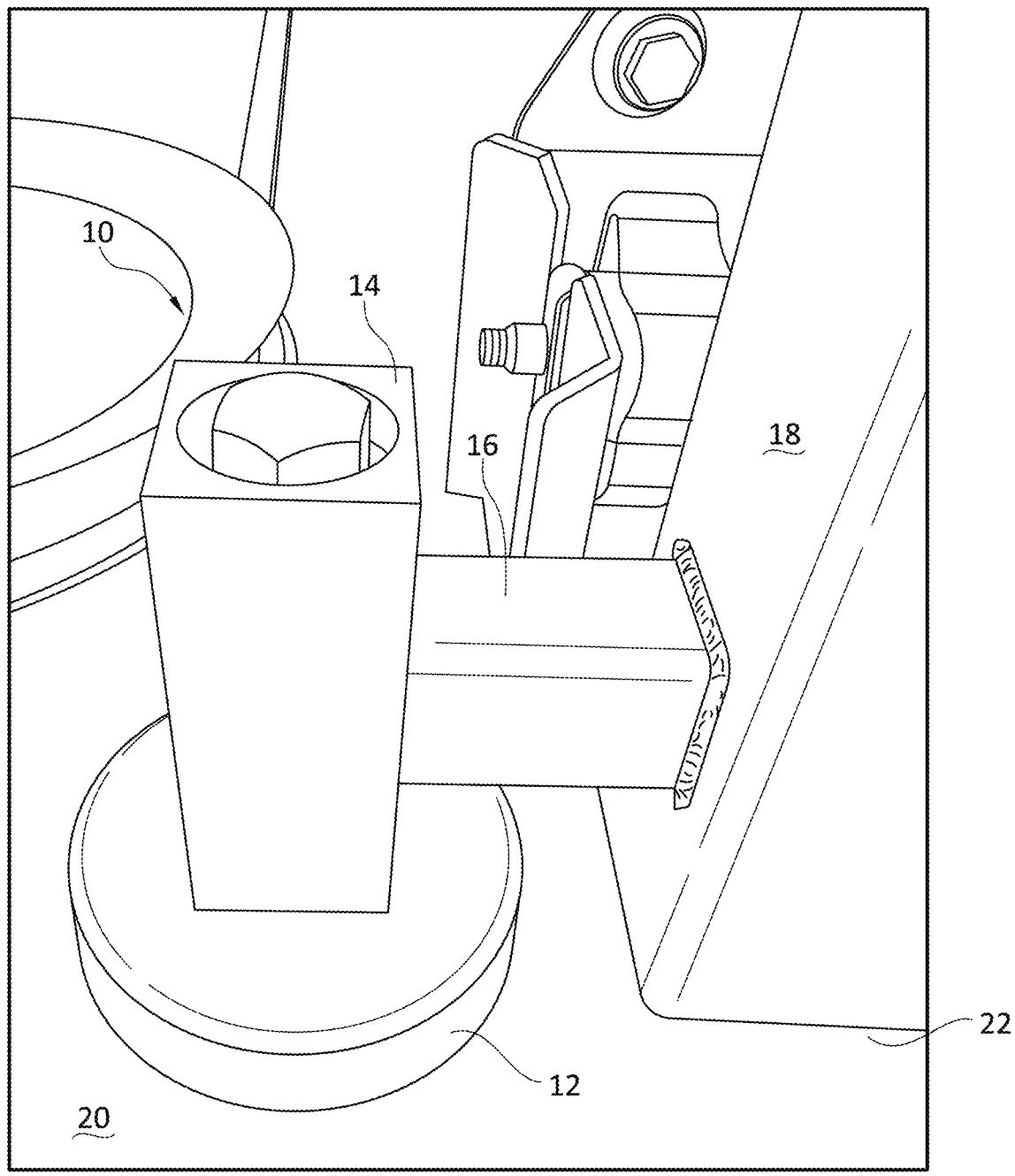
FIG. 4 is an elevated perspective view of an exemplary implementation of the apparatus of FIG. 1, according to some embodiments of the present disclosure.
Figure 5:
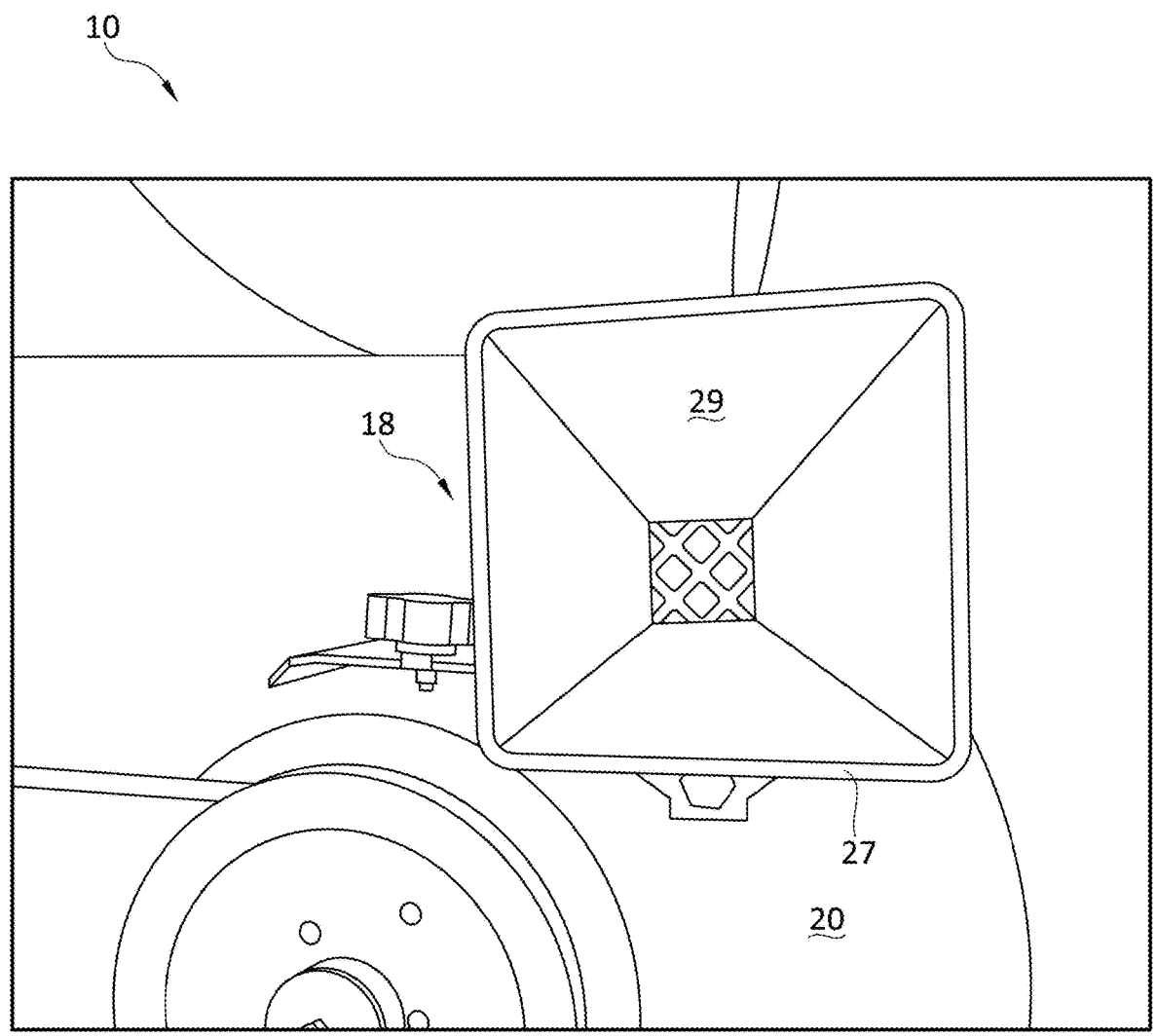
FIG. 5 is an upper perspective view of an exemplary implementation of the apparatus of FIG. 1, according to some embodiments of the present disclosure.
Figure 6:
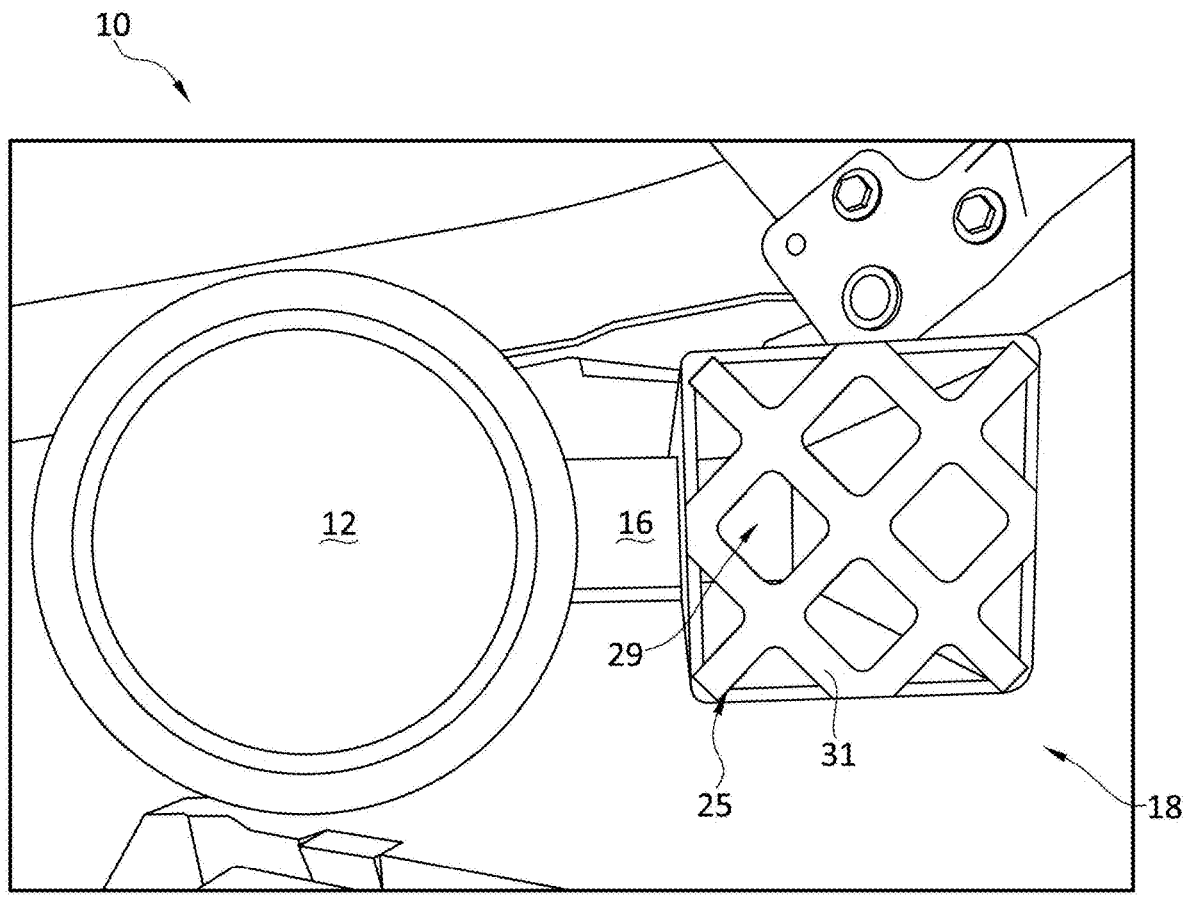
FIG. 6 is a lower perspective view of an exemplary implementation of the apparatus of FIG. 1, according to some embodiments of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

The present disclosure provides for a handheld tool receiver apparatus ("apparatus") 10. The apparatus 10 may be configured to receive and secure a handheld tool ("tool") 26, as shown in greater detail with reference to FIGS. 14-25.

Referring now to FIGS. 1-6, the apparatus 10 is shown, according to some embodiments of the present disclosure. The apparatus 10 may include a base 12, a post 14, an arm 16, and a sleeve 18. The base 12 may be secured to a lawnmower surface 20 (e.g., a deck, a blade cover, a surface below the seat of the lawnmower, etc.). In some embodiments, the base 12 includes (or is) a magnet, and thus may be secured to the surface 20 by magnetic engagement. In other words, the base 12 may include a magnet configured for magnetic engagement with the surface 20 of the lawnmower. As generally depicted herein, the base 12 is formed in a circular profile. Advantageously, such circular profile may allow for a user to remove the apparatus 10 from magnetic engagement with the surface 20 (e.g., by leaning the apparatus 10 over until the base 12 is pivoted out of its magnetic engagement with the surface 20), while also allowing for the base 12 to be provided with a magnetic engagement strong enough to keep the apparatus 10 secured to the surface 20 against various incidental bumps and jostles.

The post 14 may be disposed on the base 12 and extend upwardly from the base 12. As shown with particular reference to FIG. 4, the post 14 may be secured to the base 12 via a mechanical fastener. In this sense, the post 14 may have an internal passage that meets with a threaded bore on the base 12, and a bolt may be passed through the internal passage of the post 14 and threaded into the bore on the base 12. Of course, in further embodiments, the post 14 may be secured the base 12 in any suitable means (e.g., welding, adhesive, etc.).

The arm 16 may extend laterally from the post 14. The arm 16 may include a first end 15 disposed on the post 14, and a second end 17 opposite the first end 15. In some embodiments, the arm 16 is a separate component from the post 14, and may be secured to the post 14 in any suitable means (e.g., mechanical fasteners, adhesive, welding, etc.). In other embodiments, the arm 16 and the post 14 are formed as a singular component.

Generally, the sleeve 18 may be connected to be base 12. In particular, the sleeve 18 may be disposed on a second end 17 of the arm 16, which is secured to the base 12. The sleeve 18 may include an upper end 21 forming an upper opening 29 (shown with particular reference to FIG. 5), a lower end 19 forming a lower opening 25 (shown with particular reference to FIG. 6), and a passage 29 extending between the upper opening 29 and the lower opening 25 (shown with particular reference to FIG. 5). In some embodiments, the sleeve 18 extends vertically from the lower end 19 to an upper end 21. As shown with particular reference to FIG. 6, the lower opening 25 of the sleeve 18 may include a grate 31 (e.g., a filter, a gate, etc.) partially blocking the lower opening 25. In this sense, the lower opening 25 of the sleeve 18, in conjunction with the grate 31, may be considered to form a drain or a drainage gate. In some embodiments, and as shown with particular reference to FIG. 5, the passage 29 may form a square profile. In other embodiments, the passage 29 may form a circular profile. In other embodiments still, the passage 29 may form any suitable profile for receiving the tool 26 as discussed herein.

The sleeve 18 may be connected to the base such that a gap 22 (e.g., a vertical gap, a vertical space, a pocket, etc.), is formed between the lower opening 25 of the sleeve 18 and the surface 20 of the lawnmower. In other words, and as generally depicted herein, the sleeve 18 may be disposed on the second end 17 of the arm 16 such that the lower end 19 of the sleeve 18 maintains the gap 22 between the lower end 19 of the sleeve and the surface 20. In some embodiments, the lower end of the sleeve is vertically offset above a reference horizontal plane aligned with the lower surface of the magnet which engages a corresponding flat surface on the mower.

As discussed herein, the sleeve 18 may be configured to receive the tool 26 which, as provided for herein, may provide various safety advantages over prior art systems. For example, by resting the tool 26 within the sleeve 18, a user may operate the lawnmower without needing to use one hand to hold the tool 26 aboard the lawnmower (or rest the tool 26 at a distance away from the lawnmower). Accordingly, the user may have better control over the lawnmower, while also not be required to stop and leave the lawnmower in order to go retrieve the tool 26. Moreover, the sleeve 18 may provide a secure resting place for the tool 26, in that inadvertent bumps and jostles do not remove the tool 26 from the sleeve 18. Similarly, the magnetic engagement between the base 12 and the surface 20 of the lawnmower prevents similar bumps and jostles from dislodging the apparatus 10 in its entirety.

The tool 26 may carry various obstructions, debris, or fluids when placed in the sleeve 18. Advantageously, the grate 31 formed on the lower opening 25 may allow fluids and other smaller debris to be released from the sleeve 18, while larger debris, and the tool 26 itself, is retained in the sleeve 18. The gap 22 formed between the lower opening 25 and the surface 20 prevents a seal or other blockage from being formed between the surface 20 and the lower opening 25, thus facilitating such release of fluids and smaller debris. Such a configuration allows the apparatus 10 to be used over time as a device to retain the tool 26 without the need for continuous cleaning that would be required by grass, fluids, and other small debris collecting in the bottom of the sleeve 18.

Figure 7:
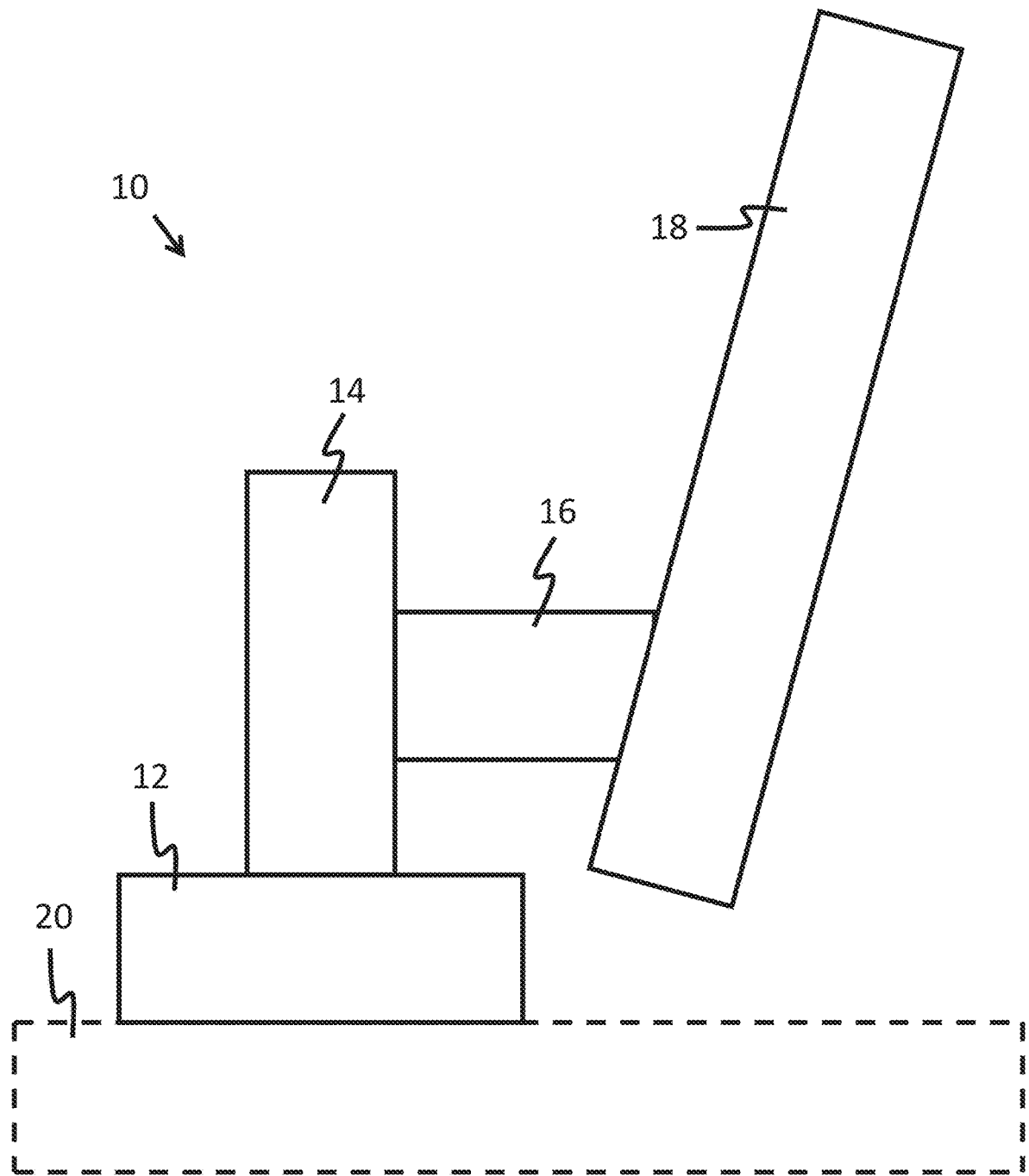
FIG. 7 is a schematic illustration of the apparatus of FIG. 1, with the sleeve in an angular orientation, according to some embodiments of the present disclosure.
Figure 8:
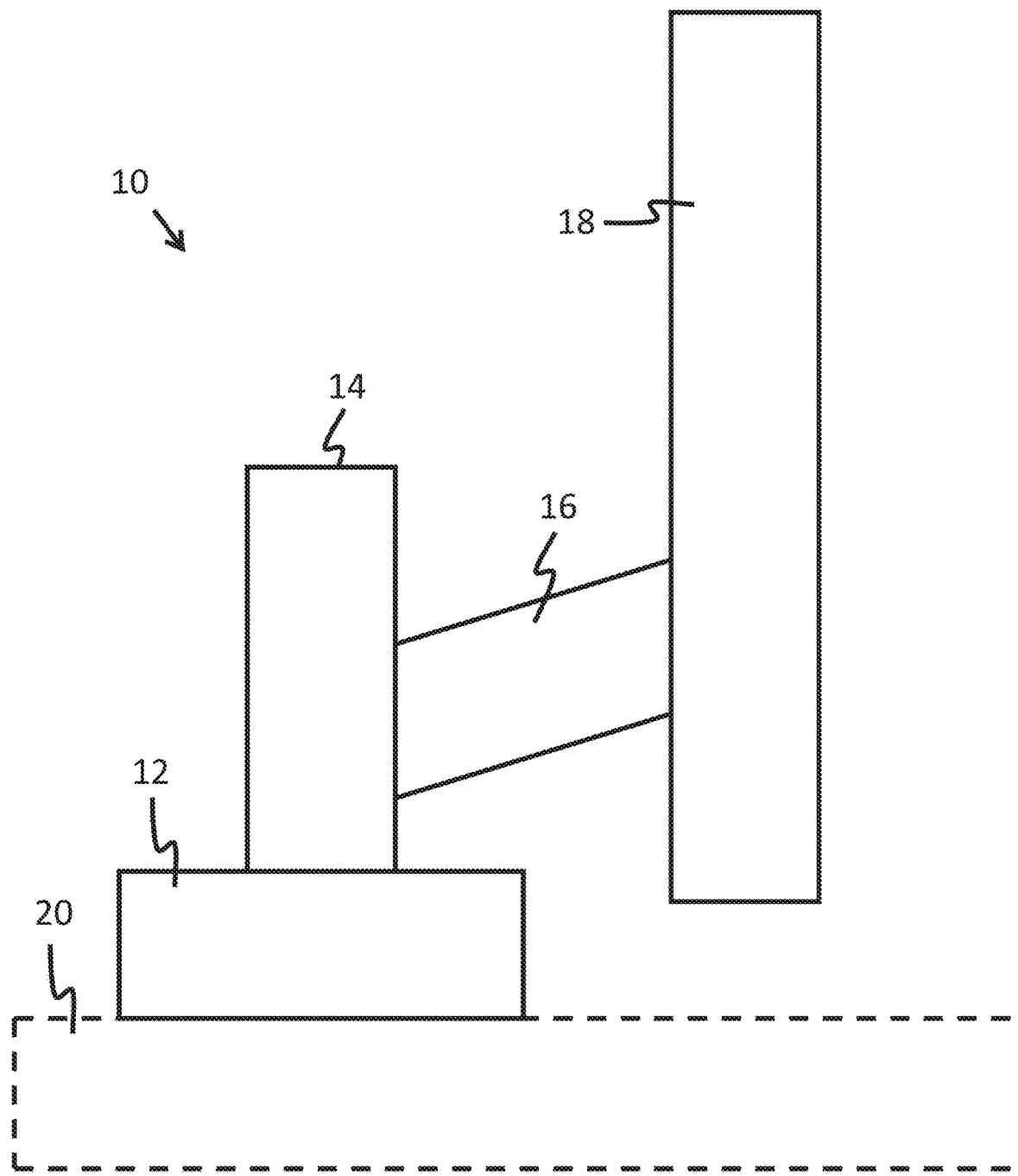
FIG. 8 is a schematic illustration of the apparatus of FIG. 1, with the arm in an angular orientation, according to some embodiments of the present disclosure.

As mentioned above, the sleeve 18 may extend vertically. In this sense, the sleeve 18 may form a right angle with the arm 16. In other embodiments, and with reference to FIG. 7, the sleeve 18 is oriented at an angle relative to the arm 16. In other embodiments still, and with reference to FIG. 8, the arm 16 is oriented at an angle relative to the post 14. It should be appreciated that, while generally shown as forming various right angles, the post 14, arm 16, and sleeve 18 may each extend at any angle suitable for providing the advantages discussed herein. Of course, the advantageous feature of the lower opening 25 of the sleeve 18 allowing fluids and smaller debris to be released from the sleeve 18 may be optimized by at least some degree of downward slope in the passage 29. Thus, the sleeve 18 may be considered to "extend vertically" so long as the profile of the sleeve 18 covers some degree of vertical translation, thus defining a slope (or precisely vertical passage) that facilitates the drainage discussed above.

Figure 9:
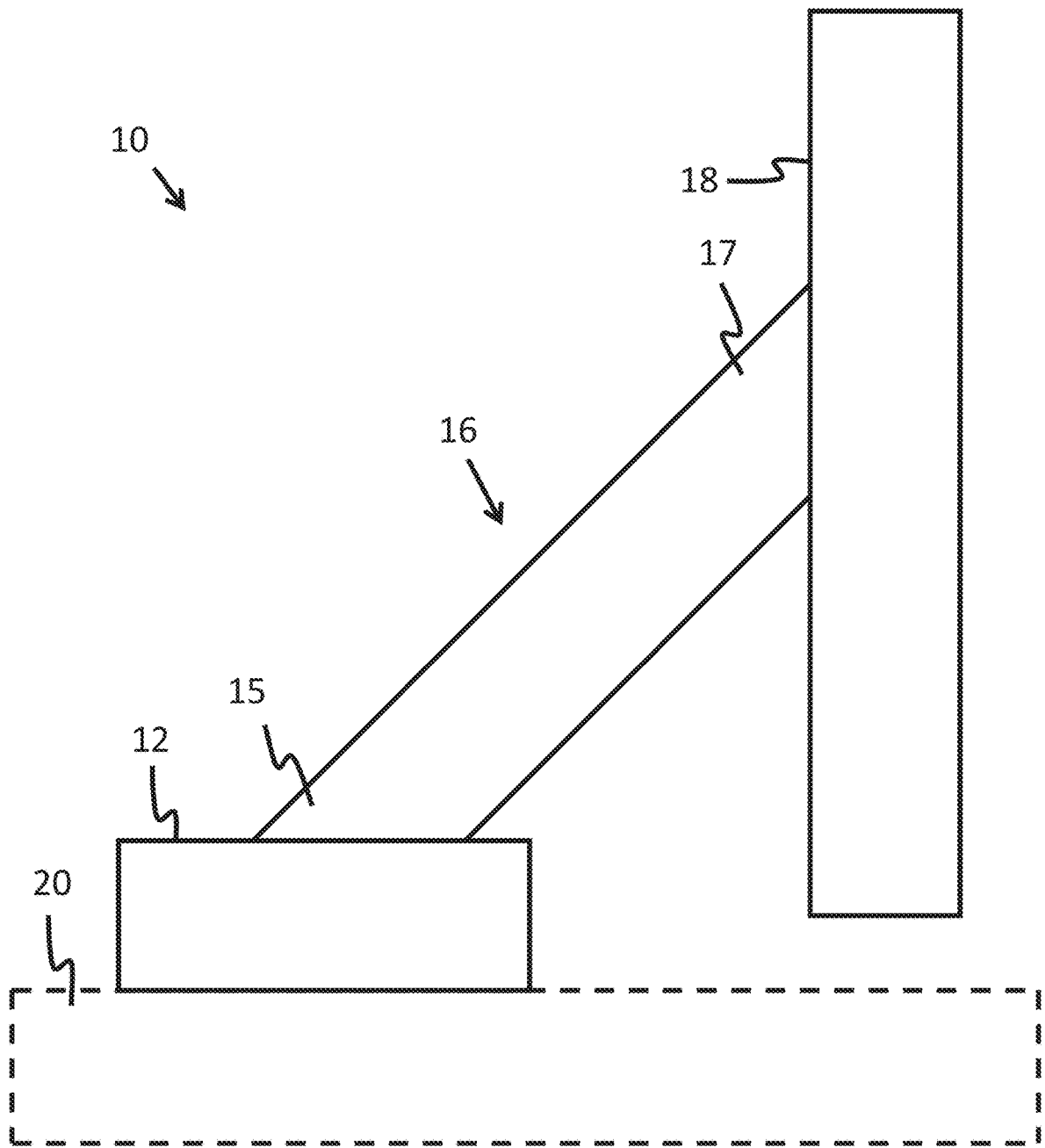
FIG. 9 is a schematic illustration of the apparatus of FIG. 1, with an angularly oriented arm replacing the post, according to some embodiments of the present disclosure.
Figure 10:
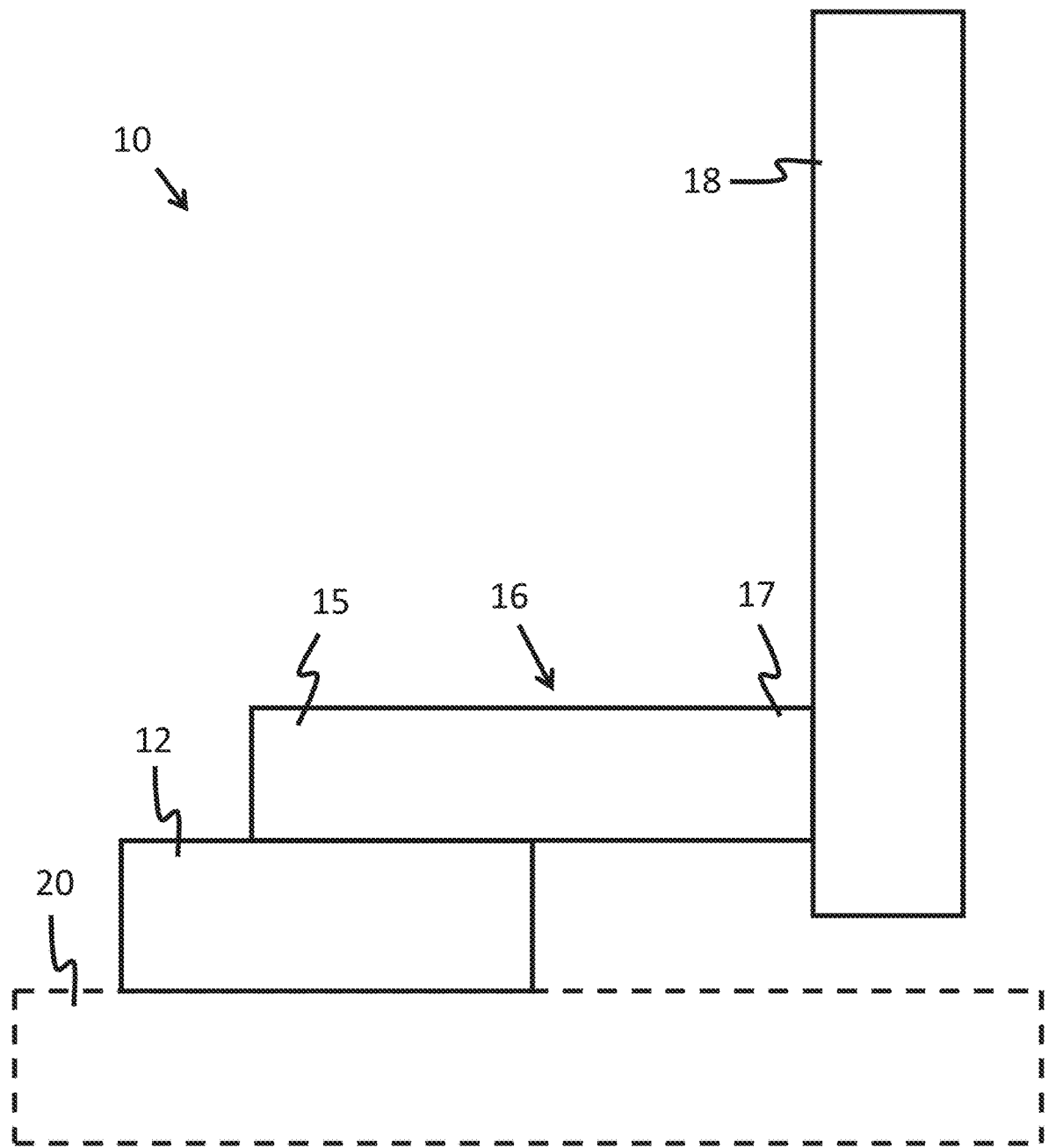
FIG. 10 is a schematic illustration of the apparatus of FIG. 1, with a laterally oriented arm replacing the post, according to some embodiments of the present disclosure.

As generally discussed herein, the post 14 extends a vertical distance, and the arm 16 extends a lateral distance in order to suitably position the sleeve 18 relative to the base 12 and the surface 20 (e.g., forming the gap 22 and allowing the drainage discussed above). In other embodiments, and with reference to FIGS. 9 and 10, the apparatus 10 does not include the post 14. In this sense, the first end 15 of the arm 16 may be disposed on the base 12, and the sleeve 18 may be disposed on the second end 17 of the arm 16. As a first example, and as shown with particular reference to FIG. 9, the arm 16 may be oriented at an angle relative to the base 12 and the sleeve 18, thus extending along both a vertical distance and a lateral distance. As a second example, and as shown with particular reference to FIG. 10, the arm 16 may simply extend laterally from the base 12. In this sense, it should be appreciated that although the post 14 and the arm 16 are generally depicted herein as a vertically extending component distinct from a laterally extending component, the post 14 and the arm 16 may be formed as a single component (e.g., the arm 16 as depicted with reference to FIGS. 5 and 6), or may be configured at any orientation suitable for positioning the sleeve 18 in order to provide the advantages discussed herein. Moreover, the arm 16 may simply be a plate, depending on the implementation of the present disclosure.

Figure 11:
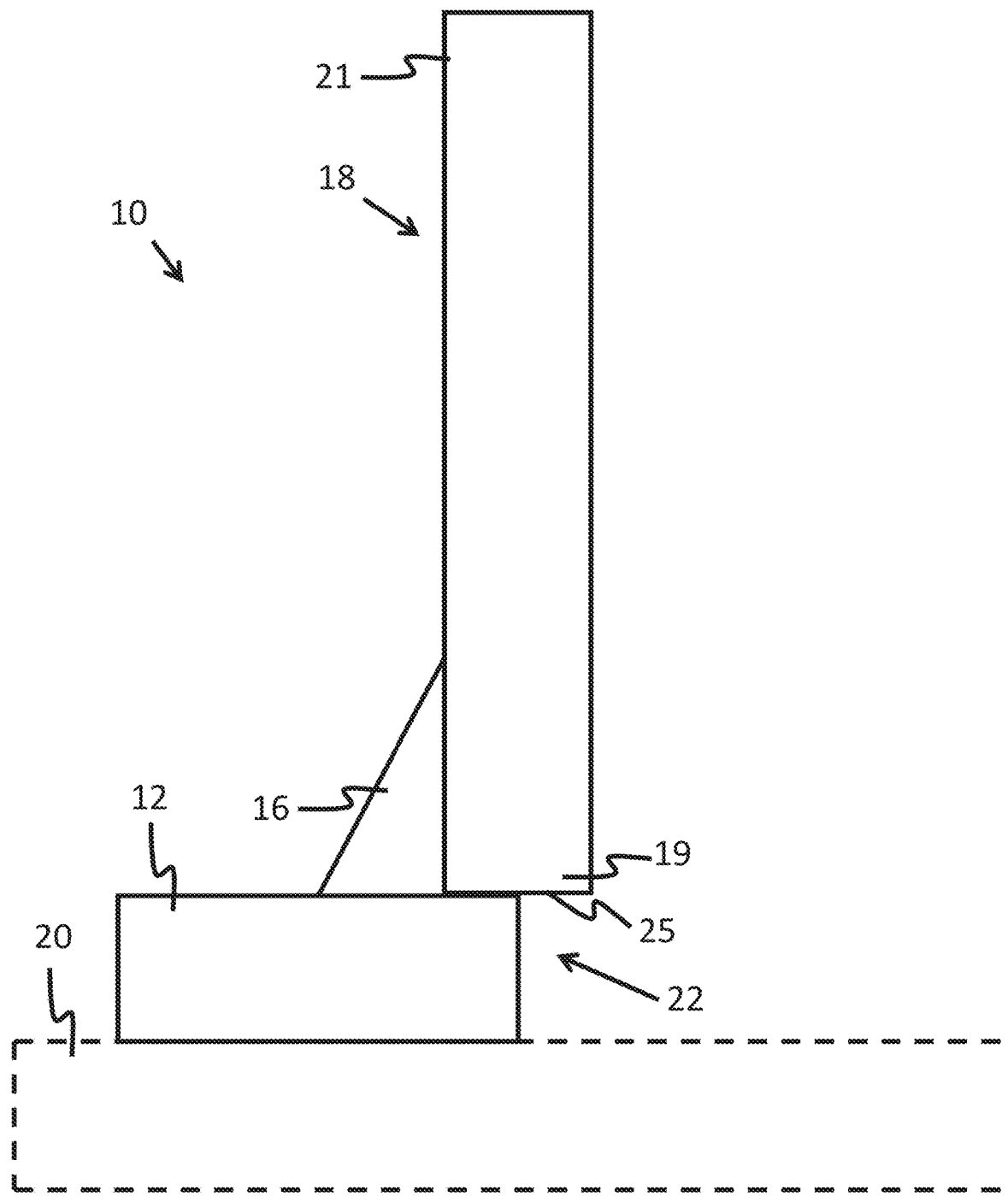
FIG. 11 is a schematic illustration of the apparatus of FIG. 1, with the sleeve disposed on the base, according to some embodiments of the present disclosure.
Figure 12:
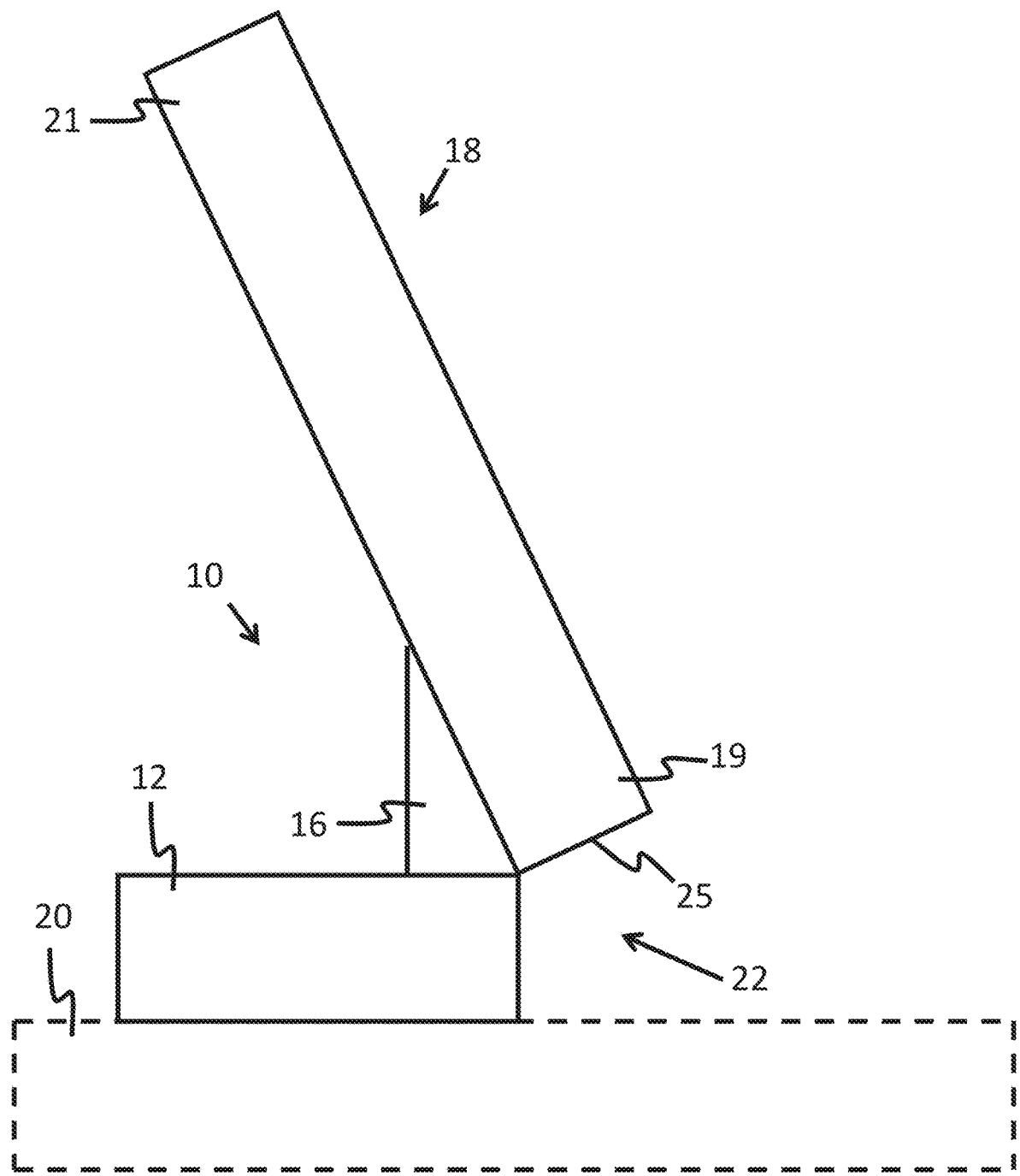
FIG. 12 is a schematic illustration of the apparatus of FIG. 1, with the sleeve disposed on the base in an angular orientation, according to some embodiments of the present disclosure.
Figure 13:
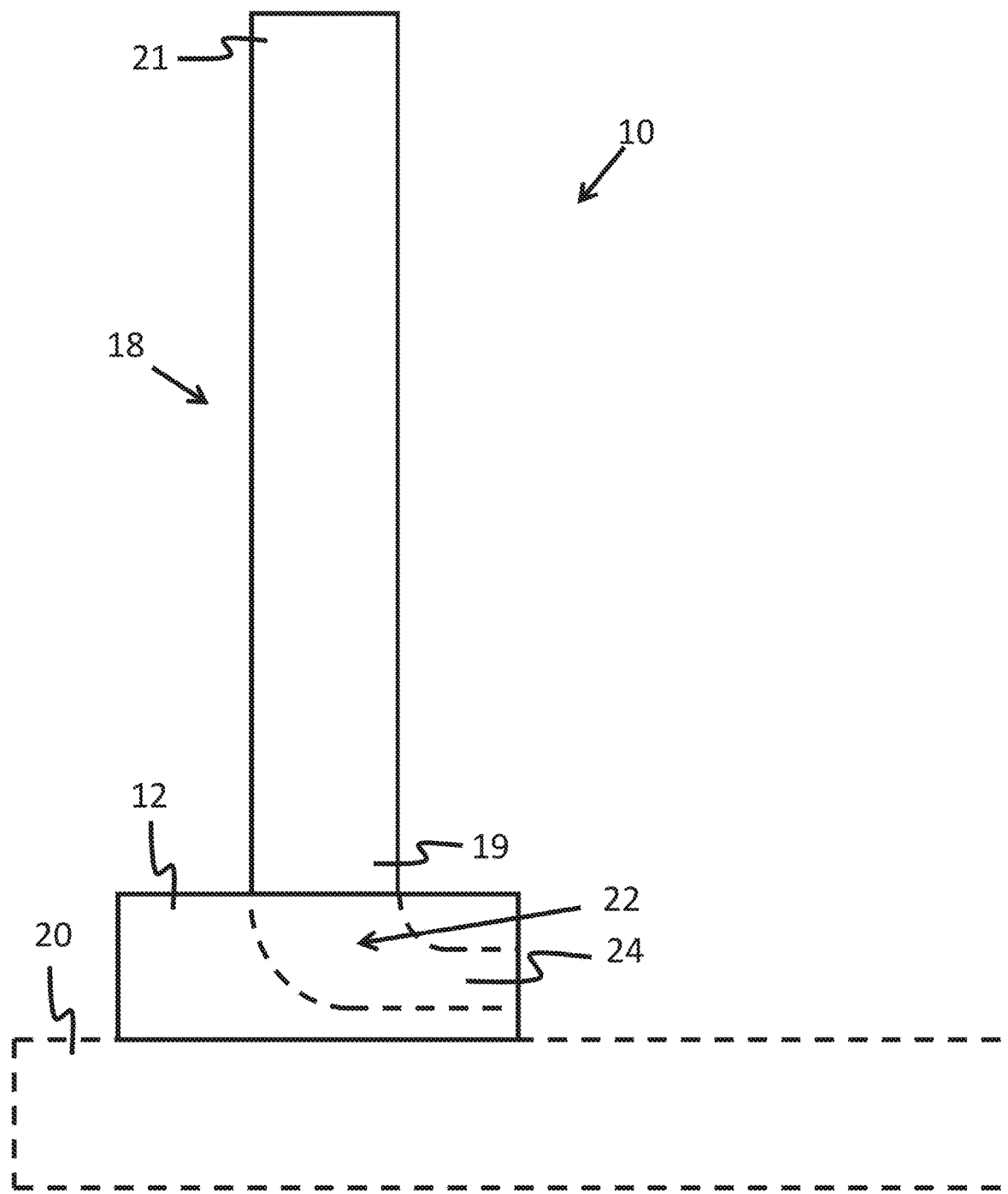
FIG. 13 is a schematic illustration of the apparatus of FIG. 1, with the sleeve disposed over a passage running through the base, according to some embodiments of the present disclosure.

Referring now to FIGS. 11-13, the lower end 19 of the sleeve 18 may simply be disposed on the base 12, according to some embodiments of the present disclosure. As mentioned above, the lower end 19 of the sleeve 18 may form the lower opening 25 configured to release debris or fluid from the sleeve 18. In some embodiments, the sleeve 18 may simply be disposed on the base 12 such the gap 22 between the lower opening 25 still exists, thus facilitating the drainage discussed above.

As a first example, and as shown with particular reference to FIG. 11, the lower end 19 of the sleeve 18 may be disposed on the base 12 such that a portion of the sleeve 18 is positioned past an outer edge of the base 12. In this sense, at least a portion of a lower face of the sleeve 18 is free of the base 12, thereby maintaining the gap 22 and allowing the lower opening 25 to release fluid and other debris. In this sense, the arm 16 may still be provided in the form of a shim or fillet that secures the sleeve 18 to the base 12 for such configurations.

As a second example, and as shown with particular reference to FIG. 12, the lower end 19 of the sleeve 18 may be disposed on the base 12 such that the sleeve 18 is oriented an angle sufficient to allow the lower opening 25 of the sleeve 18 to be free of the base 12, thus preserving the gap 22. As suggested above, the arm 16 may similarly be provided as a shim or fillet in order to secure the sleeve 18 in this or a similar orientation.

As a third example, and as shown with particular reference to FIG. 13, the base 12 may include a cut-away 24 (e.g., a duct or tunnel, or in other cases, a cut or groove) in fluid communication with the lower opening 25 of the sleeve. The cut-away 24 may be configured to receive the fluid or debris from the sleeve 18, thereby allowing the debris to travel through the cut-away 24 and out of the apparatus 10. In this sense, the gap 22 may be maintained as the interior of the cut-away 24.

Referring now to FIG. 14-26, the apparatus 10 is shown receiving the tool 26, according to some embodiments of the present disclosure. The tool 26 may be a handheld tool configured to retrieve obstructions around a lawnmower. Exemplary depictions of the tool 26 are shown with reference to FIGS. 21 and 22. In general, the tool 26 may include a rod 28 with a jaw assembly 30 disposed on a distal end of the rod 28. For example, the jaw assembly 30 may include a first jaw 32 and a corresponding second jaw 34 disposed at a distal end of the rod 28. A trigger 35 (shown with particular reference to FIG. 11) may be disposed on a proximal end of the rod 28, such that a user may open or close the jaw assembly 30 (e.g., move the first and second jaws 32, 34 closer together or away from each other) in order to grasp or release obstructions.

Figure 14:
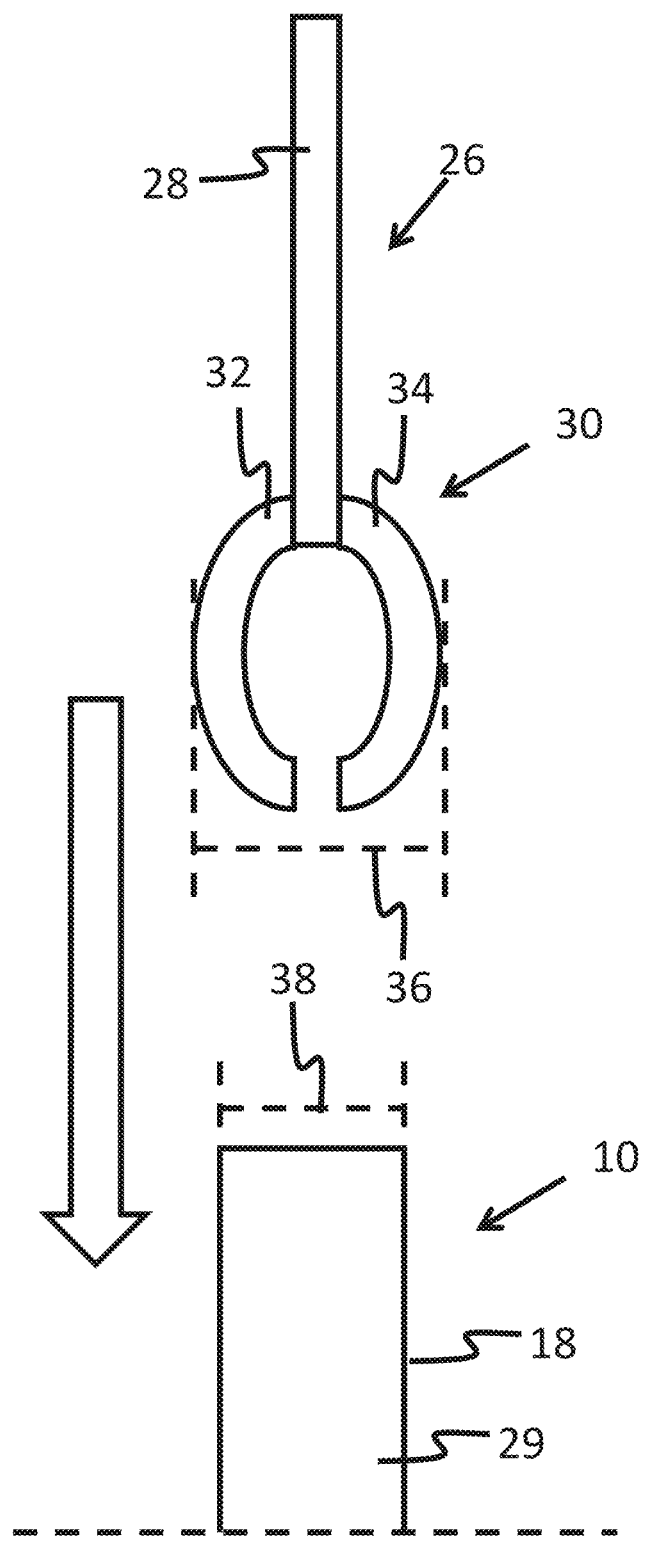
FIG. 14 is a schematic illustration of the sleeve of FIG. 1 receiving a tool, according to some embodiments of the present disclosure.
Figure 15:
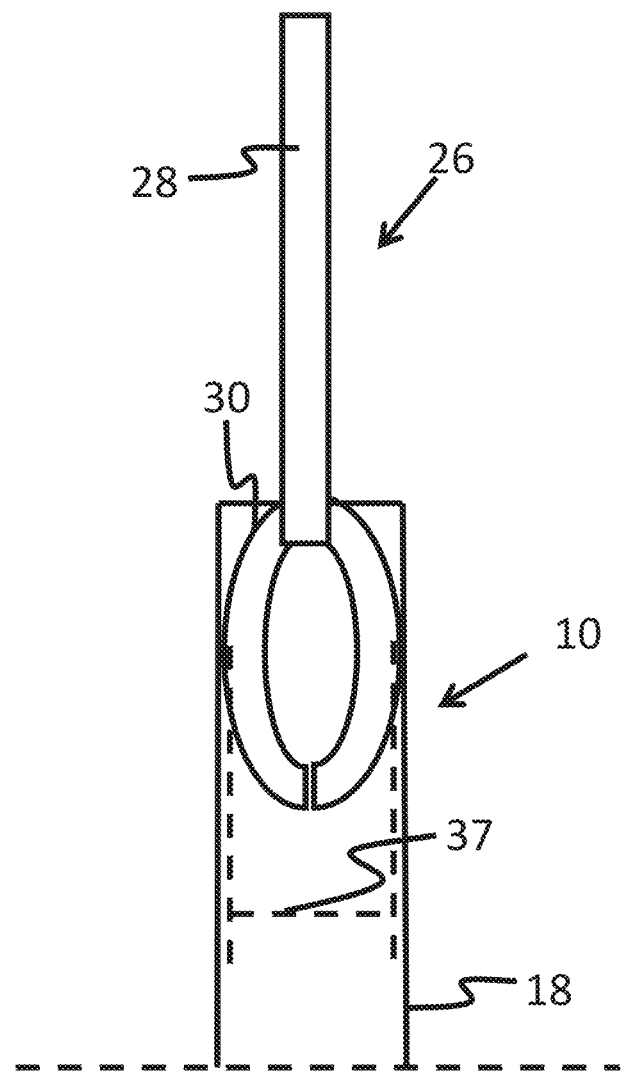
FIG. 15 is a schematic illustration of a tool received within the sleeve of FIG. 1, according to some embodiments of the present disclosure.
Figure 16:
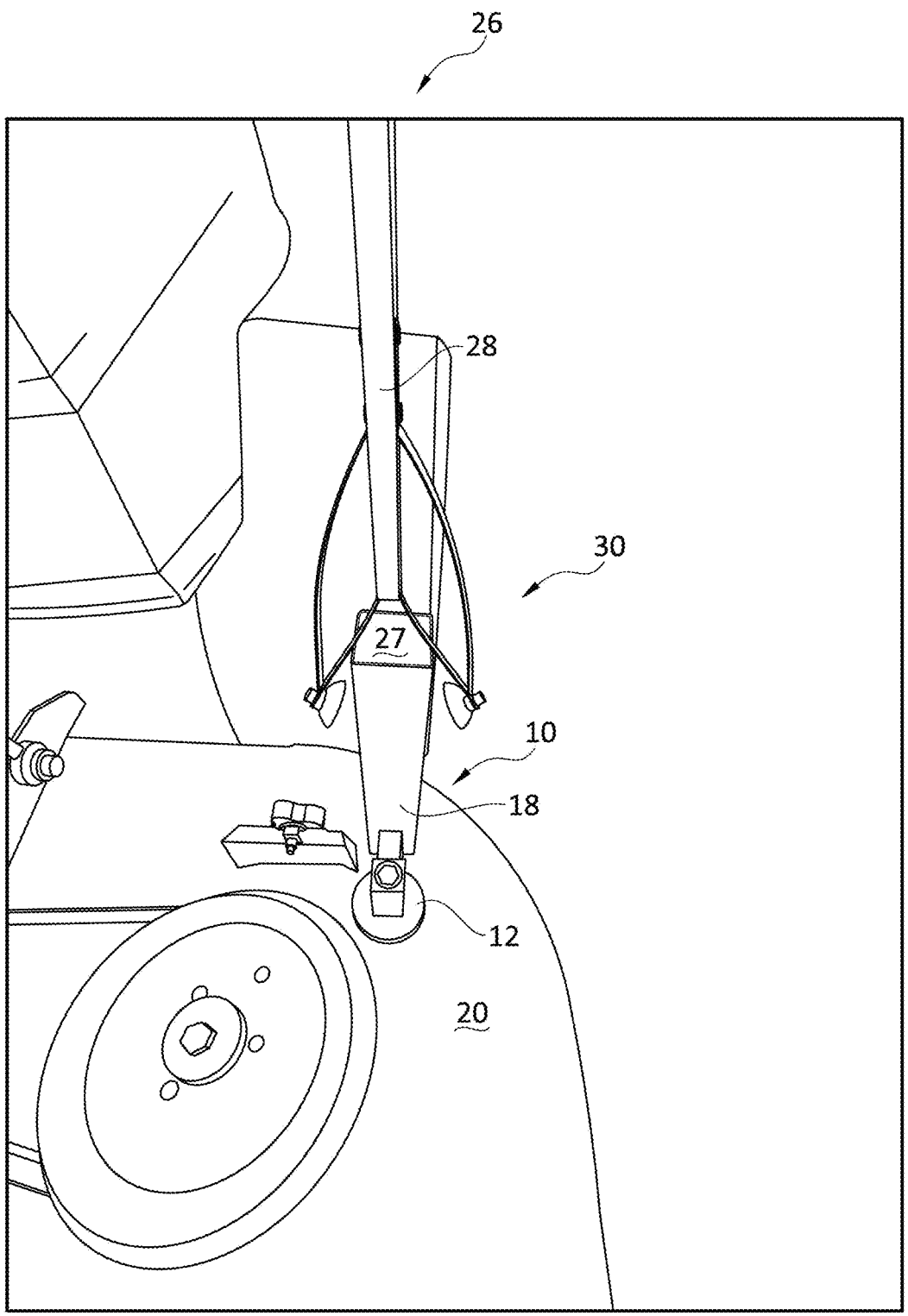
FIG. 16 is an upper perspective view of an exemplary implementation of the apparatus of FIG. 1 receiving a tool with open jaws, according to some embodiments of the present disclosure.
Figure 17:
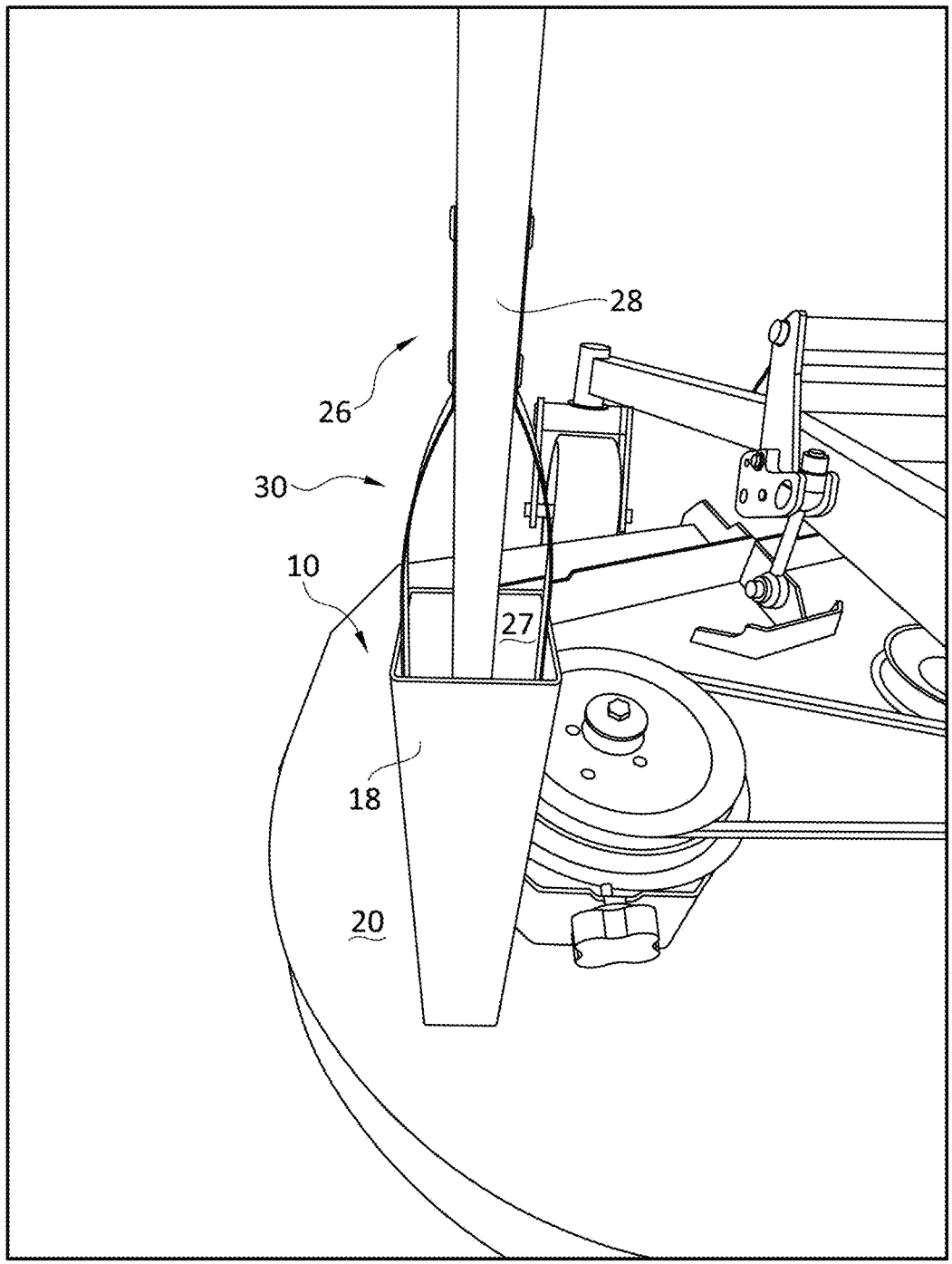
FIG. 17 is an elevated perspective view of an exemplary implementation of the apparatus of FIG. 1 receiving a tool, according to some embodiments of the present disclosure.
Figure 18:
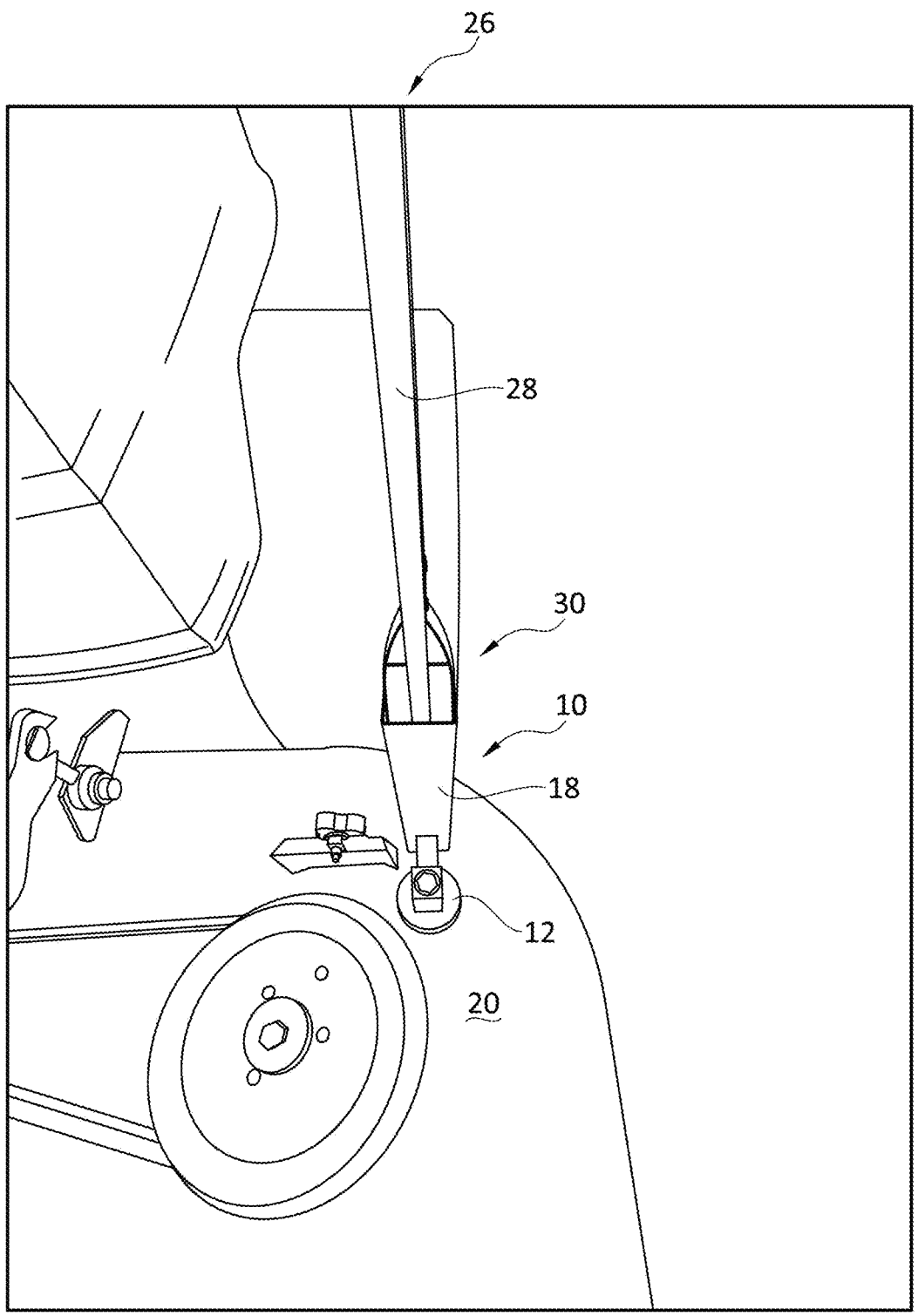
FIG. 18 is an upper perspective view of an exemplary implementation of the apparatus of FIG. 1 receiving a tool with closed jaws, according to some embodiments of the present disclosure.
Figure 19:
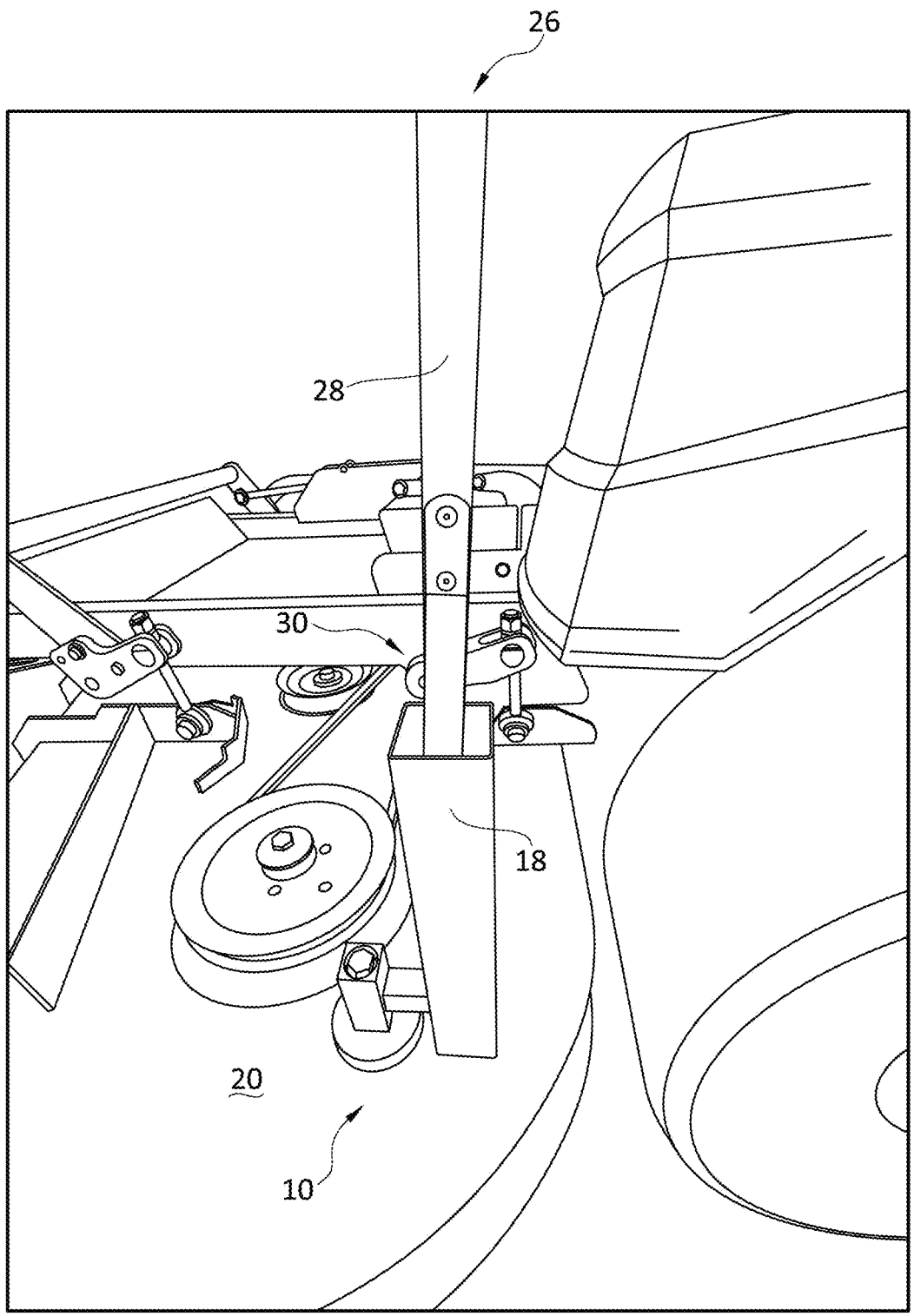
FIG. 19 is an upper perspective view of an exemplary implementation of the apparatus of FIG. 1 receiving a tool with closed jaws, according to further embodiments of the present disclosure.
Figure 20:
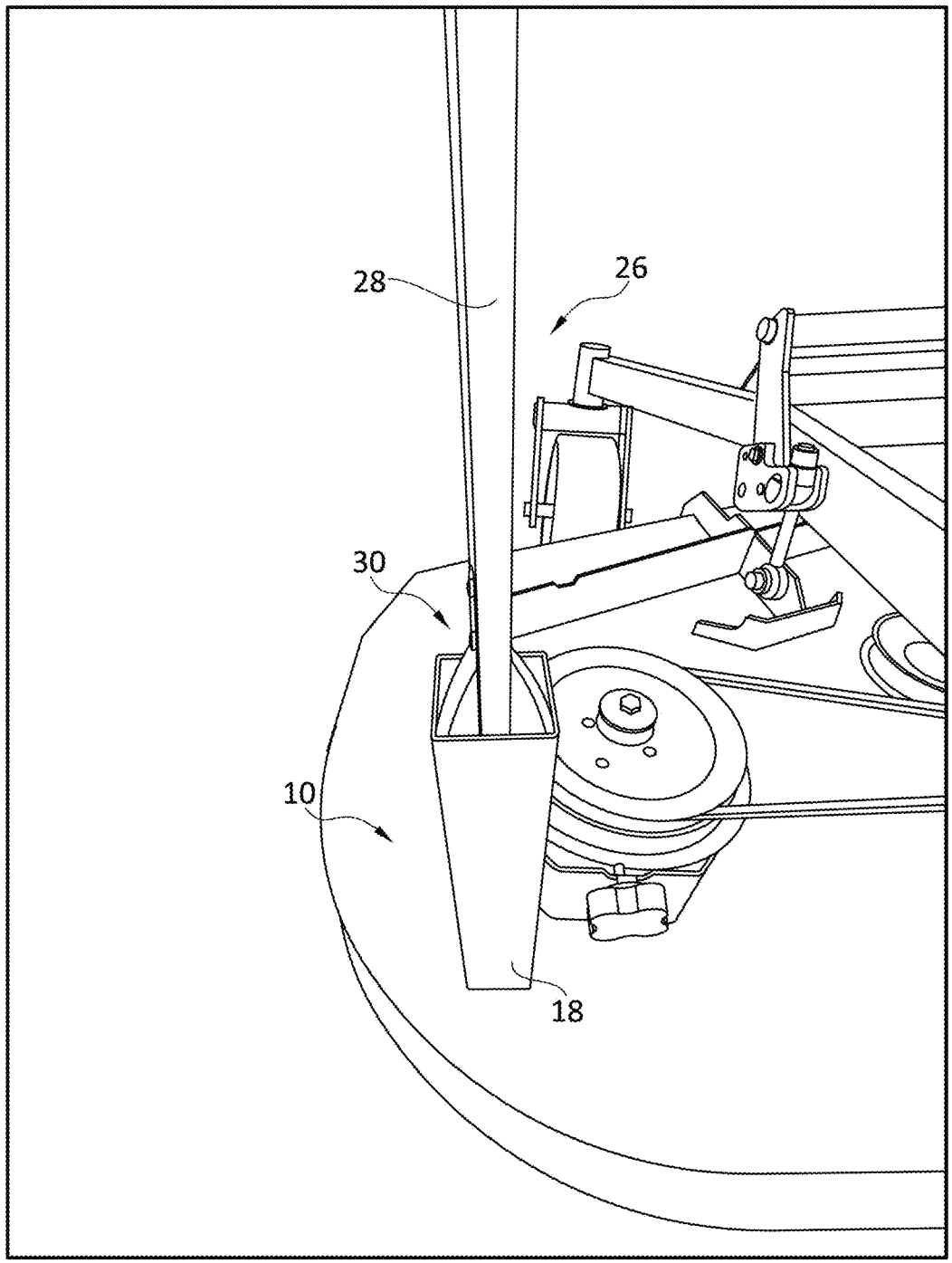
FIG. 20 is an upper perspective view of an exemplary implementation of the apparatus of FIG. 1 receiving a tool with closed jaws, according to additional embodiments of the present disclosure.
Figure 21:
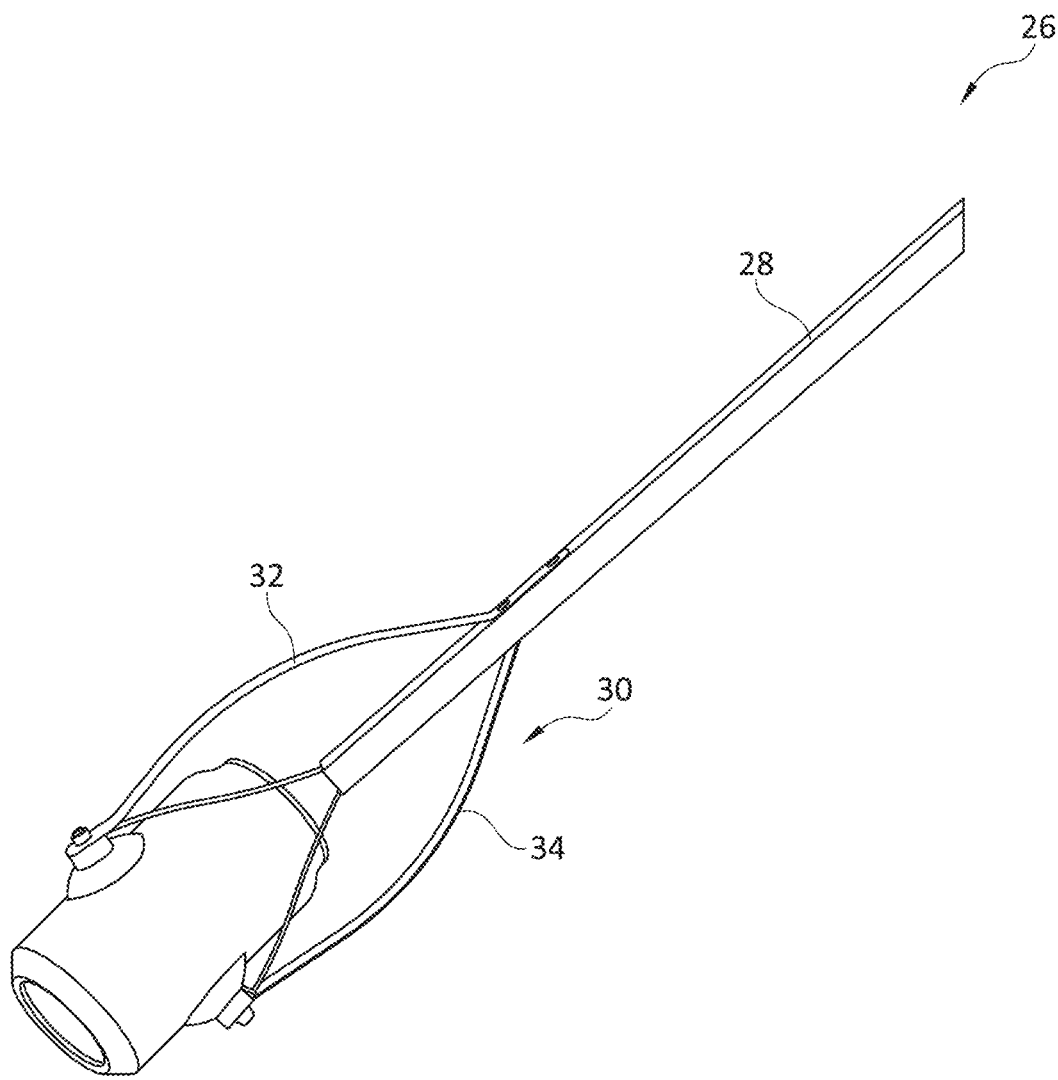
FIG. 21 is an exemplary depiction of a tool to be received by a lawnmower tool receiver apparatus, according to some embodiments of the present disclosure.
Figure 22:
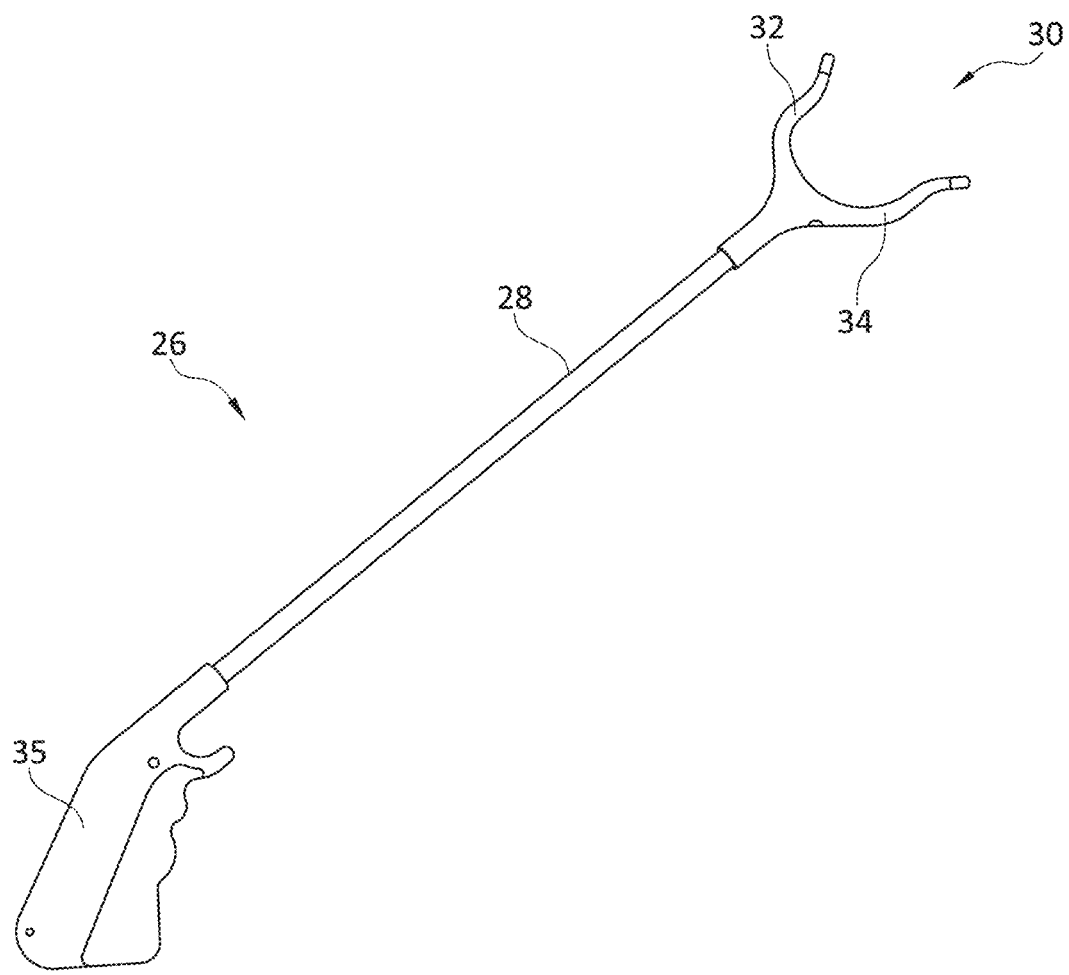
FIG. 22 is an exemplary depiction of a tool to be received by a lawnmower tool receiver apparatus, according to further embodiments of the present disclosure.
Figure 23:
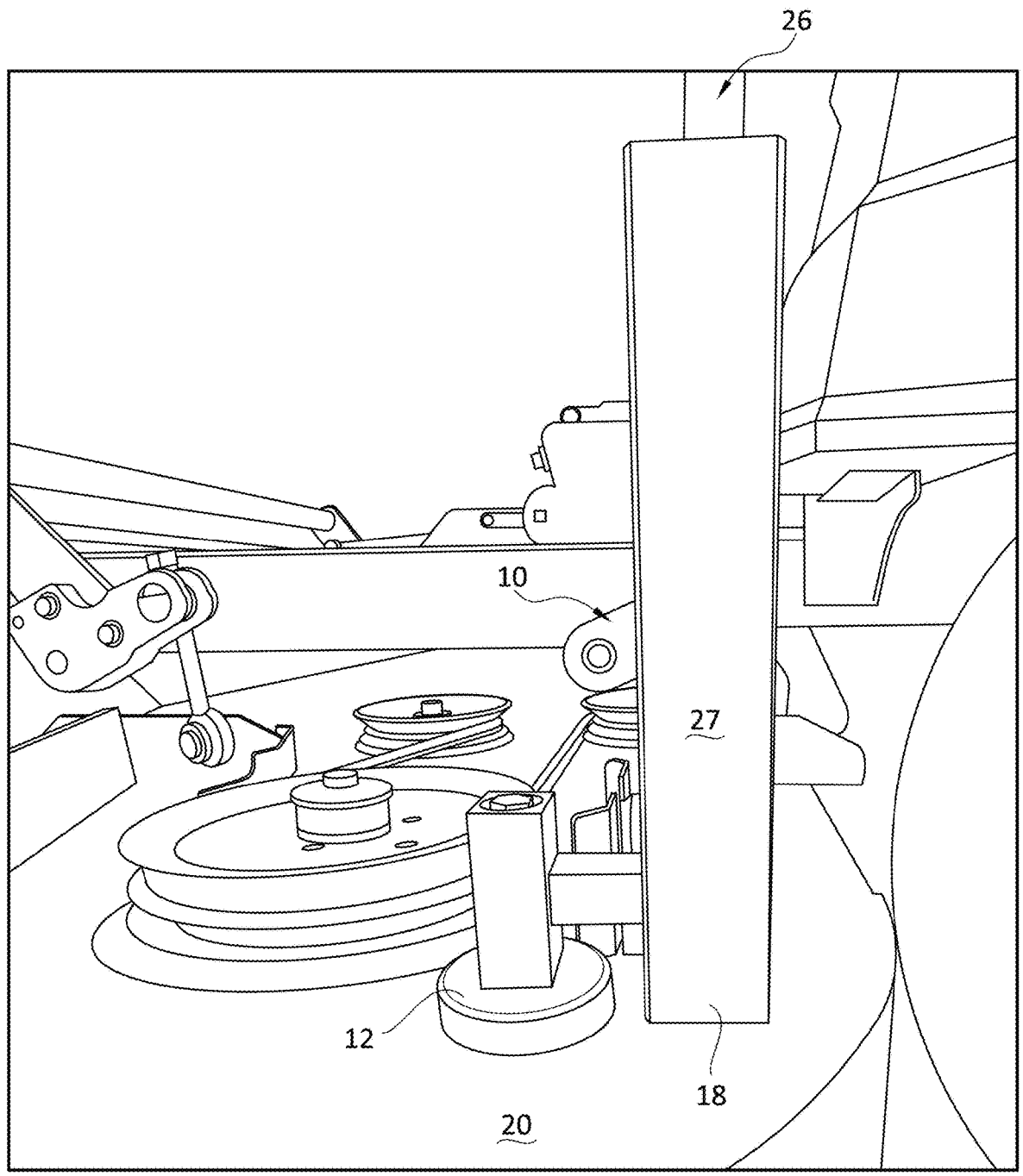
FIG. 23 is a front perspective view of an exemplary implementation of the apparatus of FIG. 1 retaining a tool, according to some embodiments of the present disclosure
Figure 24:
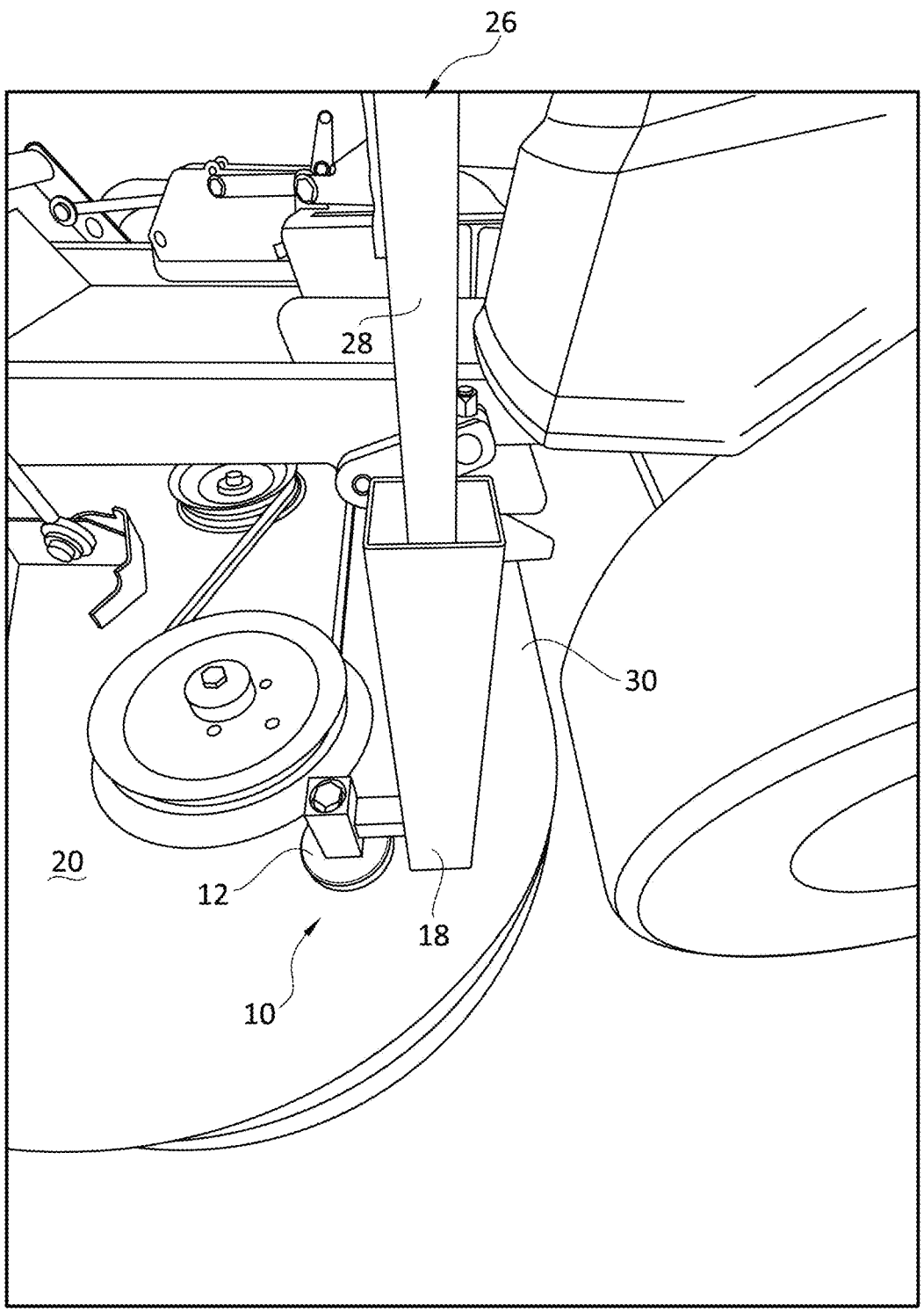
FIG. 24 is an upper perspective view of an exemplary implementation of the apparatus of FIG. 1 retaining a tool, according to some embodiments of the present disclosure.
Figure 25:
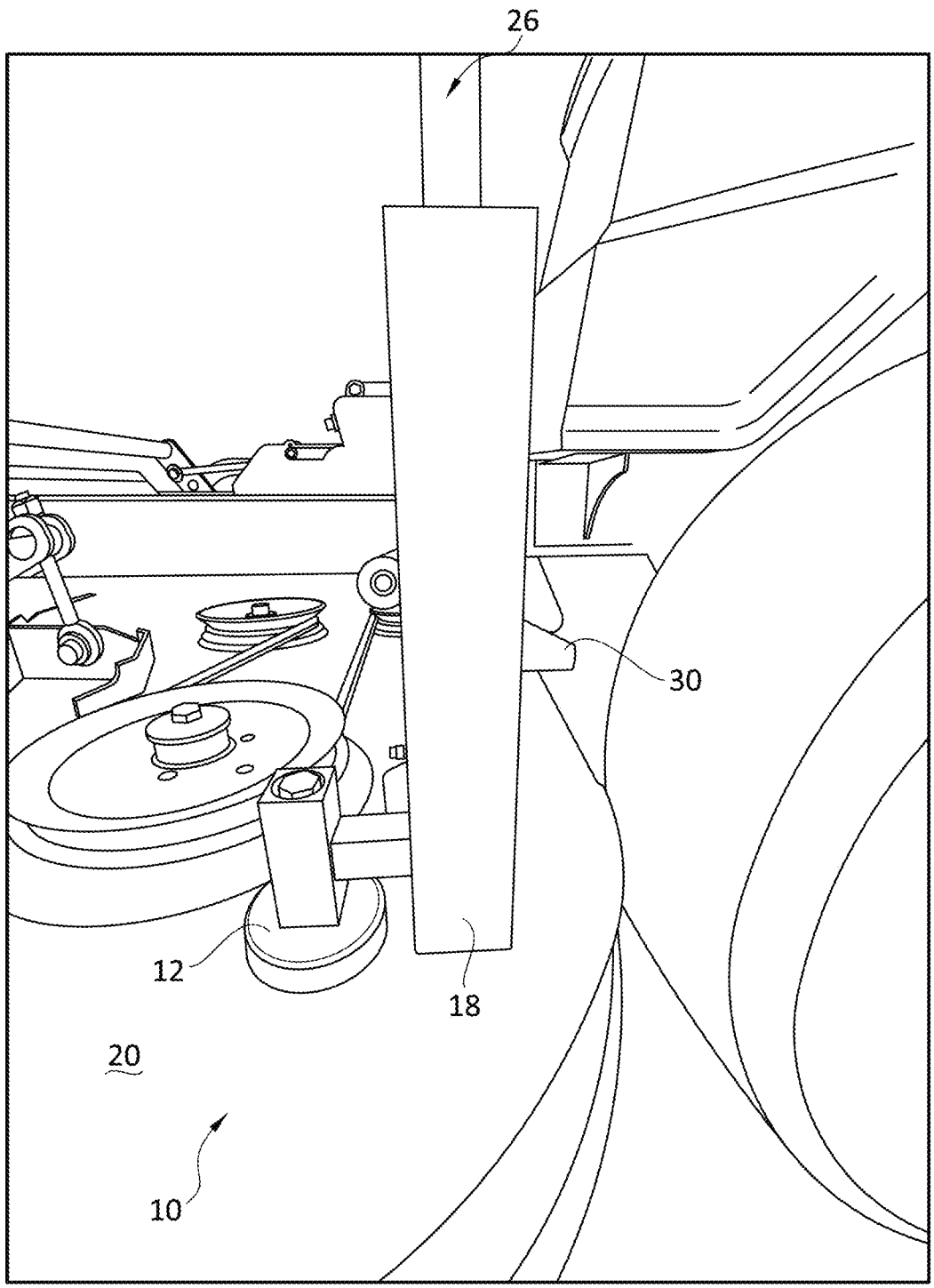
FIG. 25 is an elevated perspective view of an exemplary implementation of the apparatus of FIG. 1 retaining a tool, according to some embodiments of the present disclosure.
Figure 26:
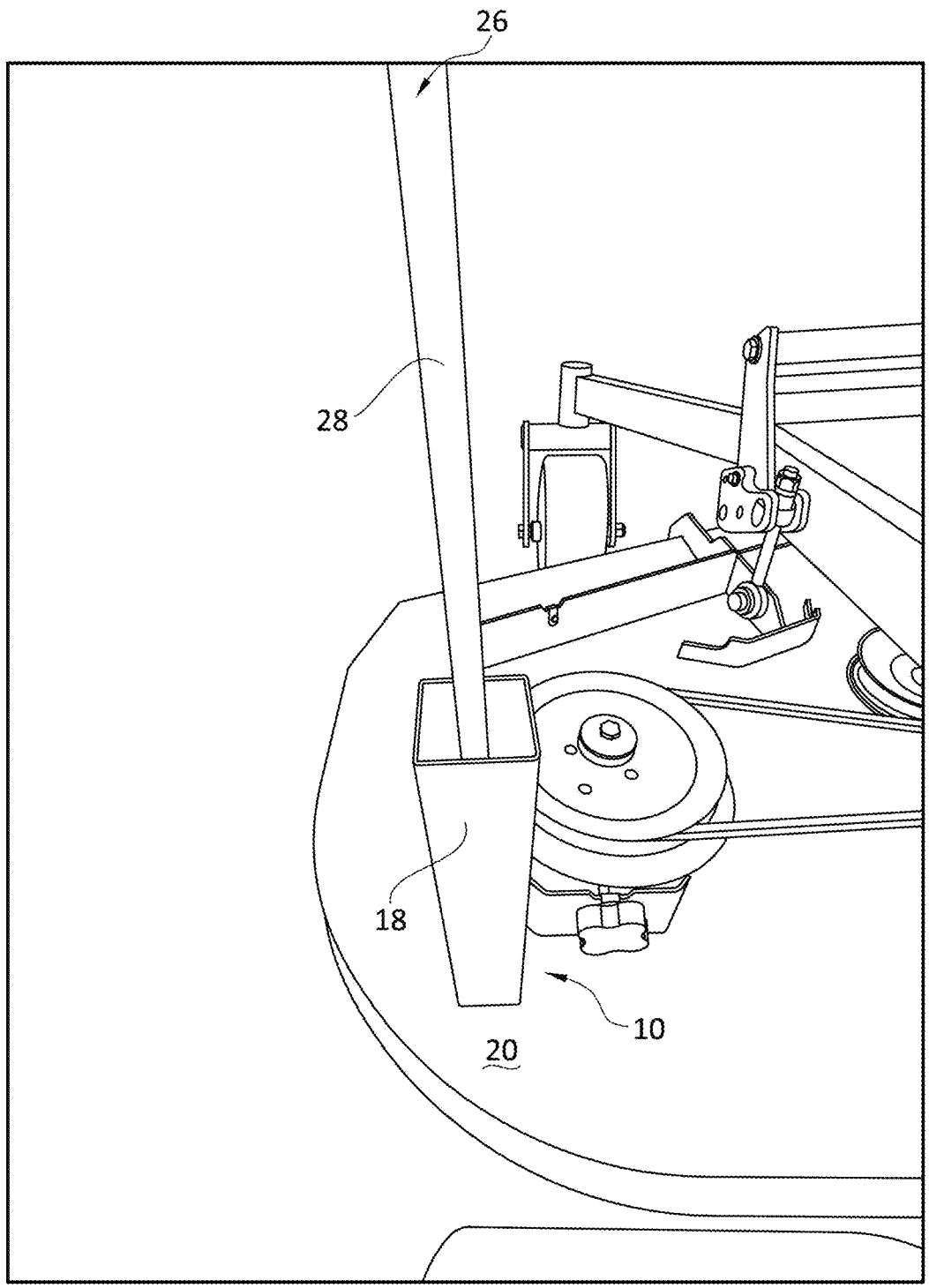
FIG. 26 is a top perspective view of an exemplary implementation of the apparatus of FIG. 1 retaining a tool, according to some embodiments of the present disclosure.

In some embodiments, the passage 29 has a first width 38 (as shown with particular reference to FIG. 14). For instance, in such embodiments where the passage 29 forms a square profile, the first width 38 may be the length between one square side and an opposite square side of the profile. In other embodiments where the passage 29 forms a circular profile, the first width 38 may be the diameter of the circular profile. In further implementations of the present disclosure involving other profiles of the passage 29 (e.g., elliptical, rectangular, etc.), the first with 38 may be the longest (or otherwise suitable, for the insertion of the tool 26 as discussed herein), length spanning the profile of the passage 29. In turn, the jaw assembly 30 of the tool 26 may have a second width 36 when the jaw assembly 30 is open (e.g., the first jaw 32 and the second jaw 34 are separated from one another) and, it follows that the jaw assembly 30 may have a third width 37 (shown with particular reference to FIG. 15) when the jaw assembly 30 is closed (e.g., when the first jaw 32 and the second jaw 34) are pressed against one another.

The first width 38 may be less than the second width 36 and equal to or greater than the third width 37. In this sense, in order to insert the tool 26 within the sleeve 18, the jaw assembly 30 must be closed at least slightly (in order to fit within the passage 29). In various implementations of the tool 26, the jaw assembly 30 is spring-loaded, such that a biasing member of the jaw assembly 30 presses the first jaw 32 away from the second jaw 34. Thus, because the first width 38 of the passage 29 is less than the second width 36 of the jaw assembly 30 (e.g., the open width), the first jaw 32 must be pressed towards the second jaw 34, and the biasing member of the jaw assembly 30 in turn resists this configuration, thereby pressing the first and second jaws 32, 34 outwards and against the inner walls of the sleeve 18 forming the passage 29. Thus, an advantageous frictional engagement may be formed between the jaw assembly 30 of the tool 26 and the sleeve 18. In other words, when the tool 26 is received within the sleeve 18, the sleeve 18 frictionally engages the jaw assembly 30 of the tool 26. Of course, the first width 38 may nonetheless be equal to or greater than the third width 37, sufficient for the tool 26 to be inserted in the sleeve 18. As discussed herein, the present disclosure further provides for a method of storing a tool aboard a lawnmower. The method may include securing the base 12 to the surface 20 of the lawnmower, securing the sleeve 18 to the base 12, and positioning the tool 26 at least partially within the sleeve 18. Of course, depending on the implementation, the sleeve 18 may be secured to the base 12 by providing the arm 16 such that the first end 15 of the arm 16 is secured to the base 12 and the second end 17 of the arm 16 is disposed on the sleeve. In turn, the first end 15 of the arm 16 may be secured to the base 12 by providing the post 14 extending upwardly from the base 12, such that the first end 15 of the arm 16 is disposed on the post 14.

Figure 27:
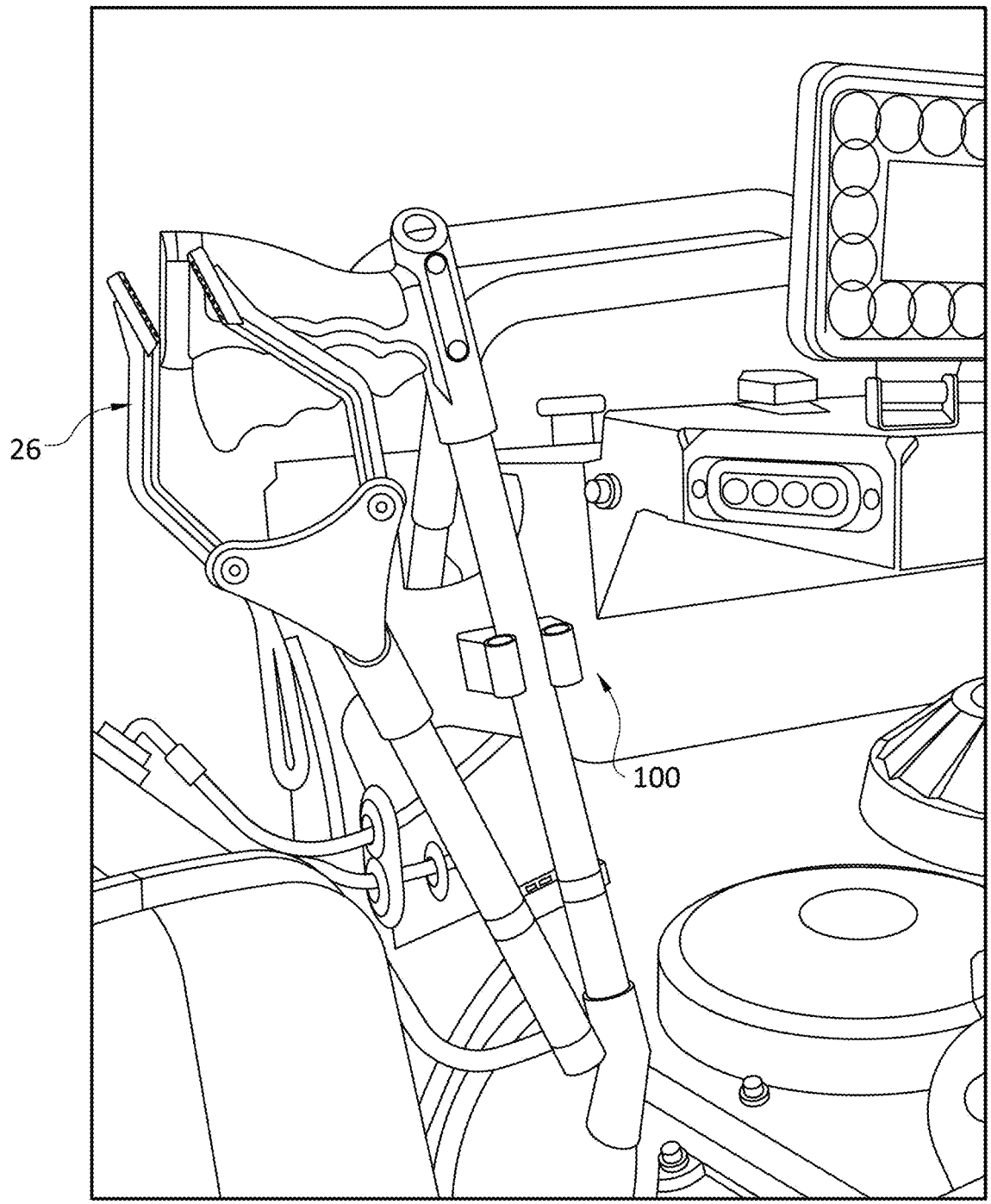
FIG. 27 is an exemplary depiction of prior art in the field of lawnmower tool receivers.
Figure 28:
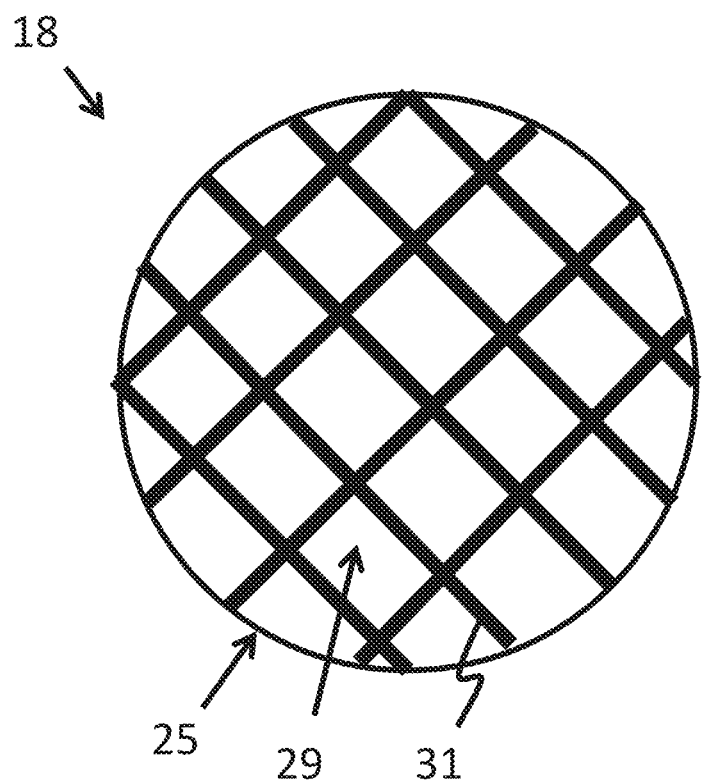
FIG. 28 is a schematic illustration of a lower perspective view of a sleeve for a lawnmower tool receiver apparatus where a passage formed by the sleeve has a circular profile.
Figure 29:
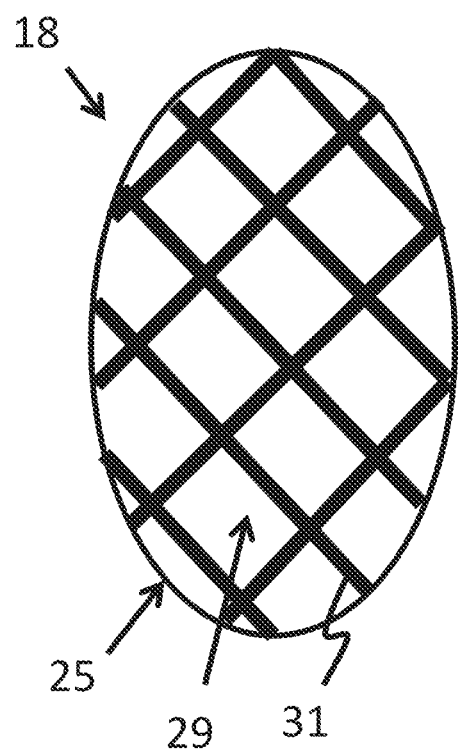
FIG. 29 is a schematic illustration of a lower perspective view of a sleeve for a lawnmower tool receiver apparatus where a passage formed by the sleeve has an elliptical profile.
Figure 30:
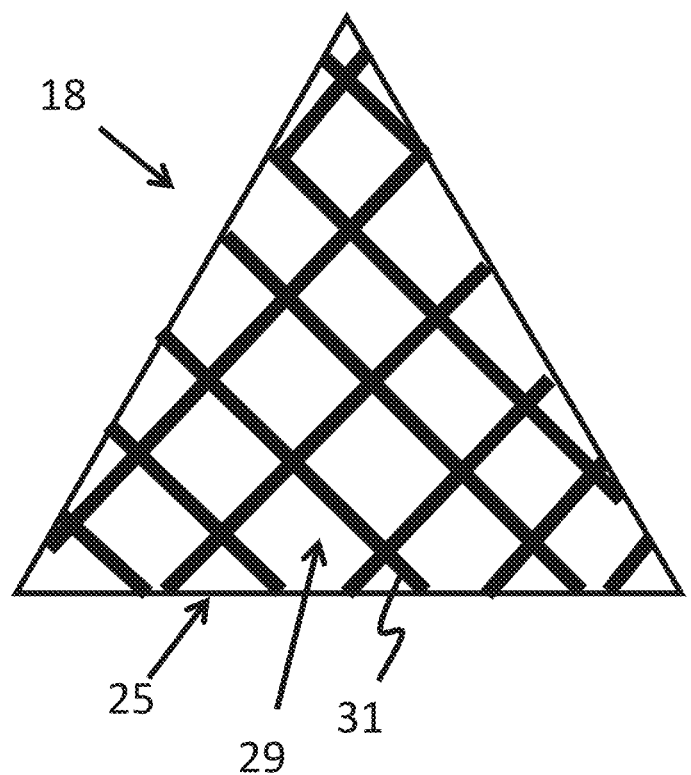
FIG. 30 is a schematic illustration of a lower perspective view of a sleeve for a lawnmower tool receiver apparatus where a passage formed by the sleeve has a triangular profile.
Figure 31:
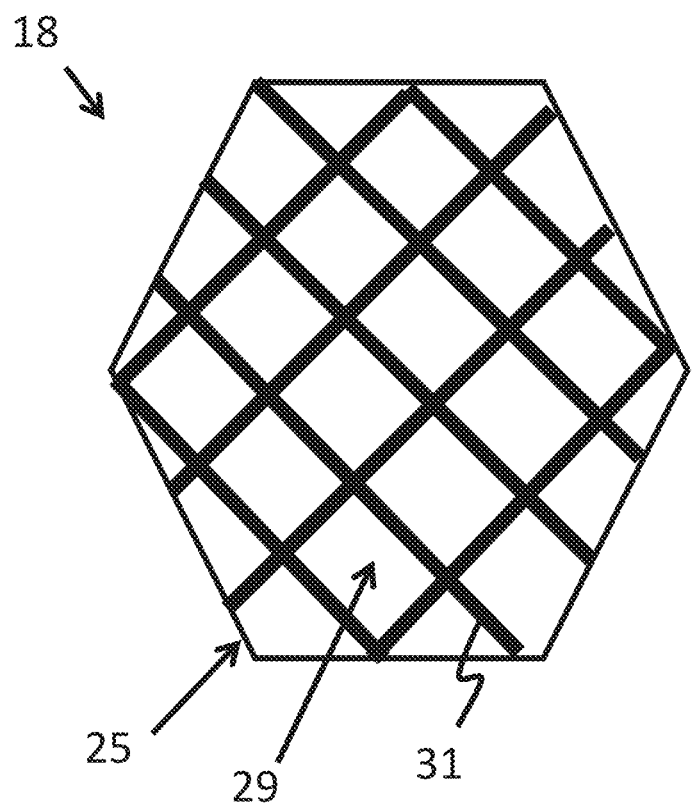
FIG. 31 is a schematic illustration of a lower perspective view of a sleeve for a lawnmower tool receiver apparatus where a passage formed by the sleeve has a hexagonal profile.

Referring now to FIG. 27, a conventional prior art system 100 is shown. The system 100 may be a typical bracket secured to a surface of the lawnmower. The present disclosure provides several advantages over the system 100. First, the tool 26 as secured by the system 100 is liable to being inadvertently knocked from the grip of the system 100, while the apparatus 10 provided for herein secures the tool 26 within the sleeve 18. Second, the tool 26 as secured by the system 100 may allow various debris (grass clippings, fluid, etc.) to fall about the seating area of the lawnmower, while the apparatus 10 as provided herein may advantageously deposit such debris immediately to a lower deck of the lawnmower, and away from the seating area. Third, the system 100 must typically be secured to the lawnmower by relatively permanent means (e.g., mechanical; fasteners), while the magnetic engagement afforded by the base 12 of the apparatus 10 allows for the position of the apparatus 10 on the lawnmower to be moved and replaced with relative ease. Fourth, the system 100 typically requires that the tool 26 be foldable, in order for the system 100 to be able to retain the tool 26 in a suitable area on the lawnmower. The apparatus 10 may be suitable for either foldable or standard configurations of the tool 26. The apparatus 10 provides for numerous advantages over prior art systems, as the foregoing merely mentions a few as examples.

As discussed above, the passage 29 of the sleeve 18 may form a square profile, a circular profile, or any other suitable profile for receiving and securing the tool 26 as discussed herein. Referring now to FIGS. 28-31, various exemplary embodiments depicting the profile of the sleeve 18 are shown, from a point of view facing the lower opening 25 of the sleeve 18 (and the grate 31 formed thereover). As shown with reference to FIG. 28, the passage 29 may form a circular profile; as shown with reference to FIG. 29, the passage 29 may form an elliptical profile; as shown with reference to FIG. 30, the passage 29 may form a triangular profile; and as shown with reference to FIG. 31, the passage 29 may form an octagonal profile. Of course, the exemplary implementations depicted in FIGS. 28-31 merely serve as additional examples of the profile which may be formed by the passage 29, as it should be understood that the sleeve 18 may be provided in any suitable shape or configuration for receiving and securing the tool 26 as discussed herein.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Thus, although there have been described particular embodiments of the present invention of a new and useful LAWNMOWER TOOL RECEIVER APPARATUS AND METHODS, it is not intended that such references to particular embodiments be construed as limitations upon the scope of this invention.

What is claimed is:

1. A tool receiver apparatus for a lawnmower, the apparatus comprising:
    a base including a magnet configured for magnetic engagement with a surface of the lawnmower;
    a post disposed on the base and extending upwardly from the base;
    an arm extending laterally from the post, the arm including a first end disposed on the post and a second end opposite the first end;
    a tool with a jaw assembly; and
    a sleeve disposed on the second end of the arm, the sleeve including an upper end forming an upper opening, a lower end, and a passage extending between the upper opening and the lower end, the passage forming a first width,
    wherein the sleeve is configured to receive the tool with the jaw assembly, the jaw assembly having a second width when the jaw assembly is open, and a third width when the jaw assembly is closed, and
    wherein the first width is less than the second width.

2. The apparatus of claim 1, wherein the lower end of the sleeve includes a lower opening and a grate.

3. The apparatus of claim 1, wherein the passage forms a square profile.

4. The apparatus of claim 1, wherein the passage forms a circular profile.

5. The apparatus of claim 1, wherein the sleeve is disposed on the second end of the arm such that a gap is formed between the lower opening of the sleeve and the surface of the lawnmower.

6. The apparatus of claim 1, wherein the base forms a circular profile.

7. The apparatus of claim 1, wherein when the tool is received by the sleeve, the sleeve frictionally engages the jaw assembly of the tool.

8. A tool receiver apparatus for a lawnmower, the apparatus comprising:
    a base including a magnet configured for magnetic engagement with a surface of a lawnmower; a tool with a jaw assembly; and a sleeve connected to the base, the sleeve including an upper end forming an upper opening, a lower end forming a lower opening having a grate, and a passage extending between the upper opening and the lower opening, the passage forming a first width,
    wherein the sleeve is connected to the base such that a gap is formed between the lower opening of the sleeve and the surface of the lawnmower,
    wherein the sleeve is configured to receive the tool with a jaw assembly, the jaw assembly having a second width when the jaw assembly is open, and a third width when the jaw assembly is closed, and
    wherein the first width is less than the second width.

9. The apparatus of claim 8, wherein the passage forms a square profile.

10. The apparatus of claim 8, wherein the passage forms a circular profile.

11. The apparatus of claim 8, wherein the magnet forms a circular profile.

12. The apparatus of claim 8, wherein the lower end of the sleeve is vertically offset above a plane of a lower surface of the magnet.

13. The apparatus of claim 8, wherein when the tool is received by the sleeve, the sleeve frictionally engages the jaw assembly of the tool.

14. A method of storing a tool aboard a lawnmower, the method comprising:
    securing a base to a surface of the lawnmower, wherein the base includes a magnet configured for magnetic engagement with the surface,
    securing a sleeve to the base, wherein the sleeve includes a passage extending between an upper opening on an upper end of the sleeve and a lower opening on a lower end of the sleeve, the passage forming a first width,
    positioning the tool at least partially within the sleeve, wherein the tool includes a jaw assembly, the jaw assembly having a second width when the jaw assembly is open, and a third width when the jaw assembly is closed,
    wherein the first width is less than the second width and equal to or greater than the third width.

15. The method of claim 14, wherein the sleeve is secured to the base by providing an arm, the arm including a first end secured to the base and a second end opposite the first end, the second end disposed on the sleeve.

16. The method of claim 15, wherein the first end of the arm is secured to the base by providing a post disposed on the base and extending upwardly from the base, wherein the first end of the arm is disposed on the post.

17. The method of claim 14, wherein the lower opening of the sleeve includes a grate.

18. The method of claim 14, wherein the sleeve is secured to the base such that a gap is formed between the lower opening of the sleeve and the surface of the lawnmower.

19. The method of claim 14, wherein the base forms a circular profile.

20. The method of claim 14, wherein the passage forms a square profile.

* * * * *